(12) United States Patent
Hosseini et al.

(10) Patent No.: US 11,716,750 B2
(45) Date of Patent: Aug. 1, 2023

(54) FEEDBACK PRIORITIZATION FOR WIRELESS COMMUNICATIONS

(71) Applicant: Qualcomm Incorporated, San Diego, CA (US)

(72) Inventors: Seyedkianoush Hosseini, San Diego, CA (US); Yi Huang, San Diego, CA (US); Yu Zhang, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/263,109

(22) PCT Filed: Aug. 8, 2019

(86) PCT No.: PCT/CN2019/099741
§ 371 (c)(1),
(2) Date: Jan. 25, 2021

(87) PCT Pub. No.: WO2020/030035
PCT Pub. Date: Feb. 13, 2020

(65) Prior Publication Data
US 2021/0307025 A1    Sep. 30, 2021

(30) Foreign Application Priority Data

Aug. 9, 2018 (WO) ................ PCT/CN2018/099552

(51) Int. Cl.
| | |
|---|---|
| *H04W 72/54* | (2023.01) |
| *H04W 76/11* | (2018.01) |
| *H04W 8/24* | (2009.01) |
| *H04W 72/0453* | (2023.01) |
| *H04W 72/23* | (2023.01) |
| *H04W 72/566* | (2023.01) |

(52) U.S. Cl.
CPC ............. *H04W 72/54* (2023.01); *H04W 8/24* (2013.01); *H04W 72/0453* (2013.01);
(Continued)

(58) Field of Classification Search
CPC .. H04W 72/1226; H04W 8/24; H04W 72/042; H04W 72/0453; H04W 72/1242;
(Continued)

(56) References Cited

U.S. PATENT DOCUMENTS

| | | |
|---|---|---|
| 2011/0249578 A1 | 10/2011 | Nayeb Nazar et al. |
| 2015/0023194 A1 | 1/2015 | Seo et al. |

(Continued)

FOREIGN PATENT DOCUMENTS

| | | | |
|---|---|---|---|
| CN | 103107866 A | * | 5/2013 |
| CN | 104380649 A | | 2/2015 |

(Continued)

OTHER PUBLICATIONS

Supplementary European Search Report—EP19848058—Search Authority—Munich—dated Apr. 13, 2022.

(Continued)

*Primary Examiner* — Shailendra Kumar
(74) *Attorney, Agent, or Firm* — Holland & Hart LLP

(57) ABSTRACT

Methods, systems, and devices for wireless communications are described. A user equipment (UE) may identify a set of channel state processes scheduled to be performed. The UE may receive a channel state feedback request corresponding to another set of channel state processes. The combination of the set of channel state processes and the other set of channel state processes may be greater than an amount that the UE may process at a given time. The UE may determine a priority for the channel state processes either on an individual or group basis. The UE may determine channel state process (es) to drop based on the determined priorities, and may perform the remaining channel state processes. The UE may generate and transmit a channel state feedback report message based on the performed channel state processes.

48 Claims, 12 Drawing Sheets

(52) U.S. Cl.
CPC ......... *H04W 72/23* (2023.01); *H04W 72/569* (2023.01); *H04W 76/11* (2018.02)

(58) Field of Classification Search
CPC ............. H04W 76/11; H04W 72/1231; H04W 72/1284; H04L 1/1671; H04L 1/0027; H04L 1/1812; H04B 7/0645; H04B 7/0626
See application file for complete search history.

(56) References Cited

U.S. PATENT DOCUMENTS

| | | | | |
|---|---|---|---|---|
| 2015/0208461 | A1* | 7/2015 | Lee | H04W 52/0209 370/311 |
| 2018/0062813 | A1* | 3/2018 | Sun | H04B 7/0626 |
| 2021/0289383 | A1* | 9/2021 | Marinier | H04B 17/24 |

FOREIGN PATENT DOCUMENTS

| | | | | |
|---|---|---|---|---|
| CN | 106899382 A | | 6/2017 | |
| CN | 107113045 A | | 8/2017 | |
| CN | 107733499 A | * | 2/2018 | ........... H04B 7/0626 |
| TW | 201806409 A | | 2/2018 | |
| WO | WO-2014048189 A1 | | 4/2014 | |

OTHER PUBLICATIONS

International Search Report and Written Opinion—PCT/CN2018/099552—ISA/EPO—dated May 6, 2019.
International Search Report and Written Opinion—PCT/CN2019/099741—ISA/EPO—dated Oct. 31, 2019.
Taiwan Search Report—TW108128541—TIPO—dated Aug. 21, 2022.

* cited by examiner

FEEDBACK PRIORITIZATION FOR WIRELESS COMMUNICATIONS

CROSS REFERENCE TO RELATED APPLICATIONS

The present Application for Patent claims priority to International Patent Application No. PCT/CN2019/099741 by Hosseini et al., entitled "FEEDBACK PRIORITIZATION FOR WIRELESS COMMUNICATIONS," filed on Aug. 8, 2019; and to International Application No. PCT/CN2018/099552, by Hosseini et al., entitled "FEEDBACK PRIORITIZATION FOR WIRELESS COMMUNICATIONS," filed on Aug. 9, 2018, each of which is assigned to the assignee hereof and each of which is hereby incorporated by reference in its entirety.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may employ channel state reporting schemes to improve channel quality conditions for communications across devices. A UE may measure qualities of a channel in order to provide feedback to a base station regarding the channel. Additionally, a UE may have limited processing resources in order to measure channel conditions. Thus, a UE may monitor and measure a certain number of channel resources at any given time.

SUMMARY

The described techniques relate to improved methods, systems, and apparatuses that support feedback prioritization for wireless communications. Generally, the described techniques provide for a user equipment (UE) to process and report channel state information (CSI) feedback based on CSI priorities. For example, a UE may receive a CSI feedback request to measure and process channel conditions. However, the UE may already have scheduled channel state processes to perform and report prior to the received feedback request. The UE may determine a priority associated with the scheduled channel state processes, the requested channel state processes, or both. Based on the priorities, the UE may select which channel state processes to perform and report.

In some cases, the UE may also determine an expiration period associated with the scheduled channel state processes. The expiration time period may be a time period in which the UE will accept another channel state feedback request, and may expire at the beginning of an uplink shared channel carrying the channel state feedback. If the UE receives a channel state feedback request prior to the expiration time period, the UE may determine whether to perform the associated channel state processes. For example, the UE may determine priorities for the channel state measurements for scheduled channel state processes and priority of any channel state feedback requests received prior to expiration of the timer and determine whether to perform or drop the scheduled channel state processes or received channel state feedback requests based on the priorities. If the UE receives a channel state feedback request after expiration of the expiration time period (e.g., after a beginning of an uplink shared channel carrying channel state feedback for a previously received request), the UE may drop the received channel state feedback or may suspend performing channel state processes associated with the received channel state feedback request until another measuring period occurs regardless of the priority level of the channel state feedback request received after expiration of the expiration time period. Accordingly, more urgent or higher priority channel state processes may be performed regardless of the order in which the associated feedback requests are received.

A method of wireless communication at a UE is described. The method may include identifying a set of CSI processes scheduled to be reported by the UE, receiving a request that the UE is to perform reporting for an additional CSI process, determining a priority of each of the set of CSI processes and the additional CSI process, updating CSI for a subset of CSI processes based on a capability of the UE and the priority of each of the set of CSI processes and the additional CSI process, and transmitting updated CSI feedback corresponding to the subset of CSI processes.

An apparatus for wireless communication at a UE is described. The apparatus may include a processor, memory coupled with the processor, and instructions stored in the memory. The instructions may be executable by the processor to cause the apparatus to identify a set of CSI processes scheduled to be reported by the UE, receive a request that the UE is to perform reporting for an additional CSI process, determine a priority of each of the set of CSI processes and the additional CSI process, update CSI for a subset of CSI processes based on a capability of the UE and the priority of each of the set of CSI processes and the additional CSI process, and transmit updated CSI feedback corresponding to the subset of CSI processes.

Another apparatus for wireless communication at a UE is described. The apparatus may include means for identifying a set of CSI processes scheduled to be reported by the UE, receiving a request that the UE is to perform reporting for an additional CSI process, determining a priority of each of the set of CSI processes and the additional CSI process, updating CSI for a subset of CSI processes based on a capability of the UE and the priority of each of the set of CSI processes and the additional CSI process, and transmitting updated CSI feedback corresponding to the subset of CSI processes.

A non-transitory computer-readable medium storing code for wireless communication at a UE is described. The code may include instructions executable by a processor to identify a set of CSI processes scheduled to be reported by the UE, receive a request that the UE is to perform reporting for an additional CSI process, determine a priority of each of the set of CSI processes and the additional CSI process, update CSI for a subset of CSI processes based on a capability of the UE and the priority of each of the set of CSI processes and the additional CSI process, and transmit updated CSI feedback corresponding to the subset of CSI processes.

In some examples of the method, apparatuses, and non-transitory computer-readable medium described herein, transmitting updated CSI feedback may include operations, features, means, or instructions for transmitting CSI feedback corresponding to the set of CSI processes and the additional CSI process, where the CSI feedback includes updated CSI feedback for the subset of CSI processes.

In some examples of the method, apparatuses, and non-transitory computer-readable medium described herein, the CSI feedback includes stale information for at least one CSI process.

In some examples of the method, apparatuses, and non-transitory computer-readable medium described herein, the CSI feedback excludes information for at least one CSI process.

Some examples of the method, apparatuses, and non-transitory computer-readable medium described herein may further include operations, features, means, or instructions for identifying a number of CSI processing units (CPUs) of the UE capable of performing a CSI process, determining whether the set of CSI processes and the additional CSI process exceeds the number of CPUs of the UE and updating CSI for the subset of CSI processes based on determining whether the set of CSI processes and the additional CSI process exceeds the number of CPUs of the UE.

Some examples of the method, apparatuses, and non-transitory computer-readable medium described herein may further include operations, features, means, or instructions for dropping at least one CSI process of the set of CSI processes based on the at least one CSI process having a lower priority than the additional CSI process.

In some examples of the method, apparatuses, and non-transitory computer-readable medium described herein, the subset of CSI processes includes the additional CSI process and excludes the at least one CSI process.

In some examples of the method, apparatuses, and non-transitory computer-readable medium described herein, dropping the at least one CSI process may include operations, features, means, or instructions for refraining from transmitting feedback for the at least one CSI process.

In some examples of the method, apparatuses, and non-transitory computer-readable medium described herein, dropping the at least one CSI process may include operations, features, means, or instructions for refraining from updating CSI for the at least one CSI process.

In some examples of the method, apparatuses, and non-transitory computer-readable medium described herein, refraining from updating CSI may include operations, features, means, or instructions for ceasing an ongoing computation of CSI for the at least one CSI process.

Some examples of the method, apparatuses, and non-transitory computer-readable medium described herein may further include operations, features, means, or instructions for dropping the additional CSI process based on the additional CSI process having a lower priority than each CSI process of the set of CSI processes.

In some examples of the method, apparatuses, and non-transitory computer-readable medium described herein, the subset of CSI processes includes each CSI process of the set of CSI processes and excludes the additional CSI process.

Some examples of the method, apparatuses, and non-transitory computer-readable medium described herein may further include operations, features, means, or instructions for receiving an indication of priority for each of the set of CSI processes or the additional CSI process and determining the priority of each of the set of CSI processes and the additional CSI process based on the indication of priority.

In some examples of the method, apparatuses, and non-transitory computer-readable medium described herein, the indication of priority for at least one CSI process of the set of CSI processes includes a downlink control information (DCI) field associated with the at least one CSI process, a search space associated with the at least one CSI process, a control resource set (CORESET) associated with the at least one CSI process, a physical downlink control channel (PDCCH) resource set associated with the at least one CSI process, a bandwidth part (BWP) associated with the at least one CSI process, a radio network temporary identifier (RNTI) masking parameter associated with the at least one CSI process, a scrambling sequence for a PDCCH associated with the at least one CSI process, a transmission reception point (TRP) identifier (ID) associated with the at least one CSI process, a block error rate (BLER) associated with the at least one CSI process, or any combination thereof.

In some examples of the method, apparatuses, and non-transitory computer-readable medium described herein, the indication of priority for the additional CSI process includes a DCI field associated with the additional CSI process, a search space associated with the additional CSI process, a CORESET associated with the additional CSI process, a BWP associated with the additional CSI process, a RNTI masking parameter associated with the additional CSI process, a scrambling sequence for a PDCCH associated with the additional CSI process, a TRP ID associated with the additional CSI process, a BLER associated with the additional CSI process, or any combination thereof.

Some examples of the method, apparatuses, and non-transitory computer-readable medium described herein may further include operations, features, means, or instructions for determining a service type, a cell index, a CSI feedback type, a CSI content type, a TRP ID, or a CSI ID associated with at least one CSI process of the set of CSI processes or the additional CSI process and determining the priority of each of the set of CSI processes and the additional CSI process based on at least one of the determined service type, cell index, CSI feedback type, CSI content type, TRP ID, CSI ID, or any combination thereof.

Some examples of the method, apparatuses, and non-transitory computer-readable medium described herein may further include operations, features, means, or instructions for identifying an expiration time period for reception of the request, determining that the request may be received after the identified expiration time period and dropping the additional CSI process based on that the request may be received after the identified expiration time period.

In some examples of the method, apparatuses, and non-transitory computer-readable medium described herein, identifying the expiration time period further may include operations, features, means, or instructions for determining a computation time period for performing the additional CSI process.

In some examples of the method, apparatuses, and non-transitory computer-readable medium described herein, the computation time period includes a time period between a last symbol of a last CSI reference signal and a first symbol of an uplink transmission carrying the CSI feedback.

In some examples of the method, apparatuses, and non-transitory computer-readable medium described herein, the computation time period includes a time period between a last symbol of a last CSI reference signal and a first symbol of an uplink shared channel transmission or an uplink control channel transmission.

Some examples of the method, apparatuses, and non-transitory computer-readable medium described herein may further include operations, features, means, or instructions for dropping all channel state information processes of the set of channel state information processes scheduled to be reported by the UE based at least in part on receiving the request that the UE is to perform reporting for the additional channel state information processes.

In some examples of the method, apparatuses, and non-transitory computer-readable medium described herein, the additional channel state information process is of higher priority than the set of channel state information processes and a number of available channel state information processing units of the UE is less than a number of channel state information processing units for performing the additional channel state information processes.

Some examples of the method, apparatuses, and non-transitory computer-readable medium described herein may further include operations, features, means, or instructions for determining that the priority of each of the set of channel state information processes and the additional channel state information process is the same, and updating the channel state information for the subset of channel state information processes according to respective timings for requests received for the set of channel state information processes and the additional channel state information process.

DETAILED DESCRIPTION

Figure 1:
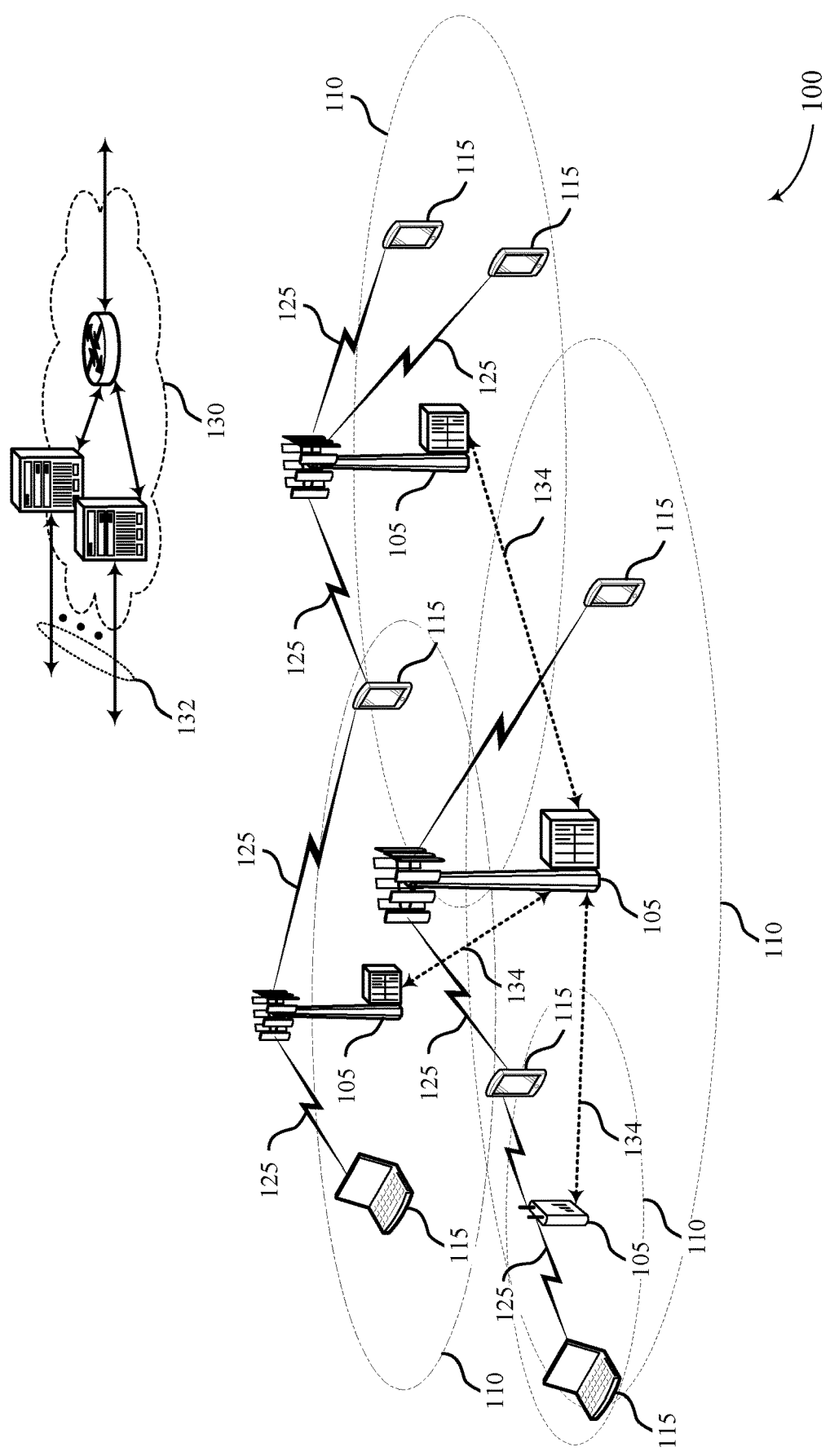
FIG. 1 illustrates an example of a wireless communications system that supports feedback prioritization for wireless communications in accordance with aspects of the present disclosure.

Some wireless communications systems may conduct channel state feedback mechanisms to monitor communication channel qualities. A device (e.g., a user equipment (UE)) in a communications system may monitor certain time-frequency resources of a channel and measure parameters indicative of the quality of the channel. The device may group these parameters together into a channel state feedback message and transmit the message to other devices (e.g., a base station) in the system. Based on the information provided in channel feedback messages, devices in the system may adjust communication parameters to improve the quality of the communication channels.

A UE may have limited capabilities in performing channel state measurements. For example, a UE may include a limited number of channel state information (CSI) processing units (CPUs), where each CPU may perform a channel state process (e.g., measurement and subsequent calculations) over a set of channel resources. Thus, if a UE receives channel state feedback requests requesting a number of channel state processes greater than the number of available CPUs (e.g., CPUs not processing or scheduled to process), the UE may not be able to perform all of the requested channel state processes. For example, a UE may refrain from updating a channel state measurement associated with a received channel state feedback request and may instead report previously generated information (e.g., old or stale information) of the channel state measurements.

Conventional channel state feedback techniques may perform on a first-come, first-served basis. Multiple channel state feedback requests may be received by a device employing a conventional feedback technique. In one example, a UE may receive feedback requests for a greater number of channel state processes than the UE is capable of calculating at any given time. For instance, a UE may receive a two separate feedback requests at different times. In conventional channel feedback techniques, the UE may address the received feedback response first, and then allocate any remaining processing resources to the other feedback requests. To do so, the device may determine that the device has the capability to perform only a subset of the total number of requested channel state processes and the device may perform the channel state processes associated with the first channel state feedback request based on the device receiving the first channel state feedback request before the second channel state feedback. However, conventional channel state feedback techniques fail to take into account higher priority updating of information for channel state processes. Thus, in cases where the other feedback requests are more urgent (e.g., for ultra-reliable low latency communications (URLLC)), conventional techniques may discard the more urgent feedback requests, or portions of the more urgent feedback requests, in favor of feedback requests received first in time.

Generally, aspects of the described techniques provide for a mechanism where a device may select channel state processes to perform based on priorities associated with the channel state processes. For example, a device may receive multiple channel state feedback requests, and perform and/or report the associated channel state processes based on priorities determined for the channel state processes. The priorities may be based on characteristics within the system irrespective of when the channel state feedback requests are received, thereby allowing more urgent or higher priority channel state processes to be performed. In some examples, priority may be given based on downlink control information (DCI) such as by using different DCI formats, DCI sizes, or based on information (e.g., an information element (IE)) in the DCI. In other examples, priority may be specified or indicated via a radio network temporary identifier (RNTI), a control resource set (CORESET) index, a search space index, etc.

Additionally or alternatively, priority rules may be established to determine the priority level (e.g., a relative priority) of a CSI report. More specifically, the priority level of the CSI report may be based on the CSI report type. Multiple types of CSI reports may be used in a wireless communications network (e.g., New Radio (NR)). For instance, a periodic, a semi-persistent, and/or an aperiodic CSI report may be used in NR, and each type of CSI may be configured differently. A periodic CSI report may be configured through Radio Resource Control (RRC) signaling from a base station. The UE may then transmit periodic CSI on the physical uplink control channel (PUCCH). A semi-persistent CSI report may be configured through RRC signaling from a base station and may be activated and/or deactivated by a Medium Access Control (MAC) control element (MAC-CE). The UE may then transmit semi-persistent CSI on the PUCCH. Further, a semi-persistent CSI report may be activated and/or deactivated by DCI, which may include a cyclic redundancy check (CRC) scrambled by a semi-persistent-CSI-RNTI. The UE may then transmit semi-persistent CSI on the physical uplink shared channel (PUSCH). An aperiodic CSI report may be scheduled (e.g., dynamically) by an uplink grant from a base station. In some cases, the uplink grant may also schedule uplink data (e.g., uplink shared channel (UL-SCH)) on the same uplink channel (e.g., PUSCH) as the aperiodic CSI report. In other cases, the uplink grant may not schedule uplink data (e.g., UL-SCH) on the same uplink channel (e.g., PUSCH) as the aperiodic CSI report. The UE may then transmit aperiodic CSI, with or without data, on the PUSCH.

A UE may identify a set of channel state feedback processes that are scheduled to be reported by the UE. The UE may receive a channel state feedback request associated with another set of channel state processes to be reported. In some cases, the UE may determine when the set of channel state processes and the other set of channel state processes are scheduled to be reported. Additionally or alternatively, the UE may determine, based on the scheduling of the channel state processes, how many channel state processes of the set of channel state processes and the other set of channel state processes are capable of being updated based on a processing capability (e.g., a number of CPUs) of the UE. In some cases, the total number of channel state feedback processes may be greater than a processing capability of the UE. The UE may therefore determine priorities for the channel state feedback processes, and may select which of the processes to update and report based on the determined priorities. For example, higher priority channel state feedback processes may be performed and other (e.g., lower priority) channel state feedback processes may be dropped (e.g., may not be performed).

Aspects of the disclosure are initially described in the context of a wireless communications system. Aspects of the disclosure are further illustrated by timelines implemented by a wireless communications system. Aspects of the disclosure are further illustrated by and described with reference to apparatus diagrams, system diagrams, and flowcharts that relate to feedback prioritization for wireless communications.

FIG. 1 illustrates an example of a wireless communications system 100 that supports feedback prioritization for wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier (ID) for distinguishing neighboring cells (e.g., a physical cell ID (PCID), a virtual cell ID (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may identify a set of channel state processes scheduled to be performed by the UE 115. The UE 115 may receive a channel state feedback request corresponding to one or more additional channel state processes to be reported or updated. In some examples, the combination of the set of channel state processes and the other set of channel state processes may be greater than an amount that the UE 115 may process at a given time. The UE 115 may determine a priority for the channel state processes either on an individual or group basis and determine channel state process(es) to drop, if any, based on the determined priorities. The UE 115 may perform updating and/or reporting for the remaining (e.g., non-dropped) channel state processes and generate and transmit a channel state feedback report message (e.g., to a base station 105) based on the performed channel state processes.

Figure 2:
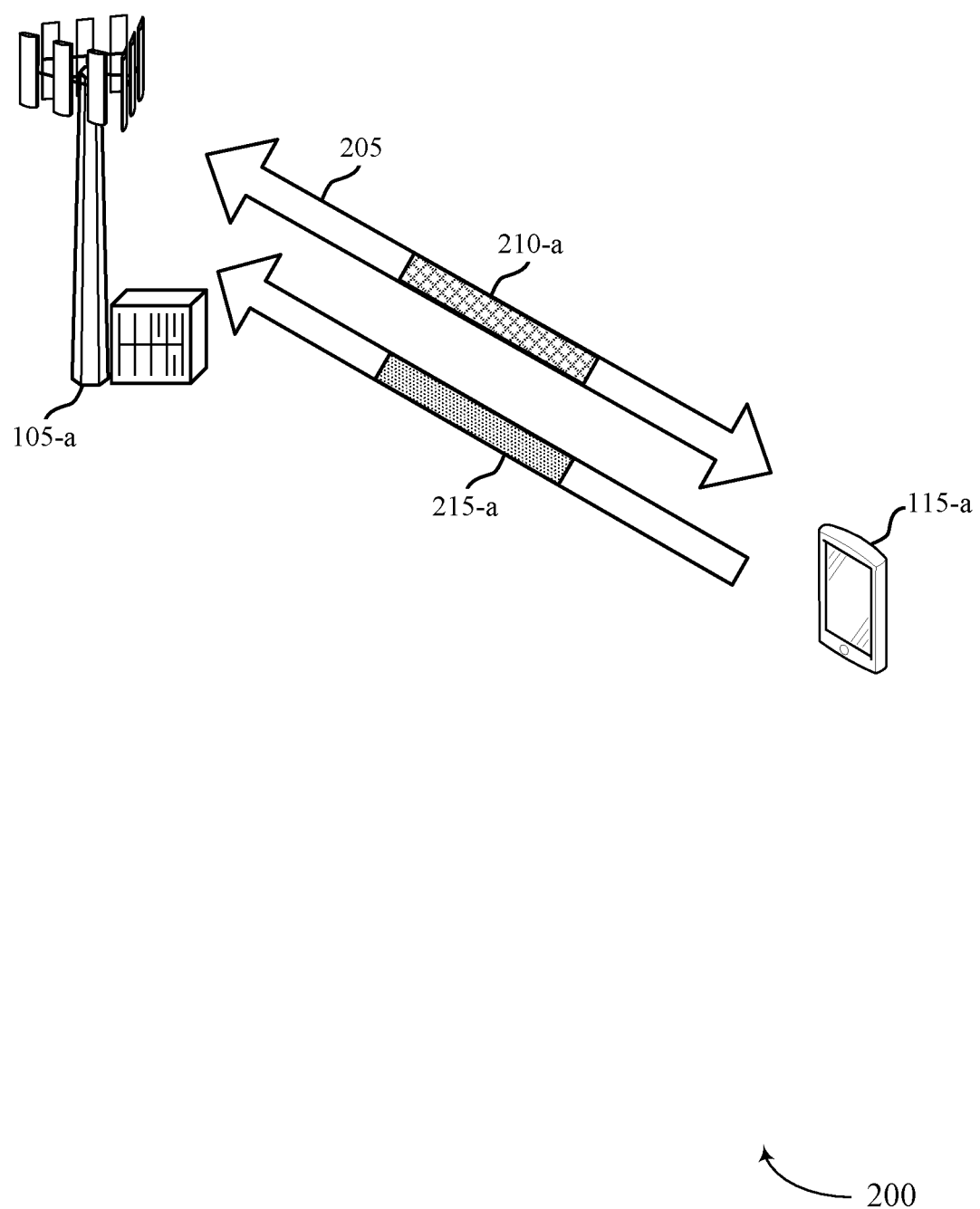
FIG. 2 illustrates an example of a wireless communications system that supports feedback prioritization for wireless communications in accordance with aspects of the present disclosure.

FIG. 2 illustrates an example of a wireless communications system 200 that supports feedback prioritization for wireless communications in accordance with aspects of the present disclosure. In some examples, wireless communications system 200 may implement aspects of wireless communications system 100. Wireless communications system 200 may include a base station 105-*a* and a UE 115-*a*. Base station 105-*a* may communicate with UE 115-*a* over channel 205. In some cases, UE 115-*a* may perform channel state calculations 210-*a* based on the measurements. UE 115-*a* may transmit a channel state feedback message 215-*a* based on the channel condition processes.

Channel state feedback reports may be periodic or aperiodic. For periodic reports, UE 115-*a* may receive DCI indicating periodic measurement intervals and scheduled uplink resources for transmitting corresponding channel state feedback reports. For aperiodic reports, base station 105-*a* may transmit a channel state feedback request to UE 115-*a*. UE 115-*a* may in turn conduct a channel state feedback procedure based on the received request which may involve updating and/or reporting CSI.

Each channel state feedback request may indicate a set of channel state calculations for UE 115-*a* to perform. Each channel state calculation may include UE 115-*a* monitoring (e.g., measuring) a set of time-frequency resources (e.g., an RE of an OFDM symbol) of channel 205. In some cases, UE 115-*a* may support a limited number of simultaneous channel state calculations. UE 115-*a* may include a number of CPUs, where each CPU may process a channel state calculation.

In some examples, UE 115-*a* may receive a number of simultaneous channel state calculations greater than the number CPUs available at UE 115-*a*. For example, UE 115-*a* may receive a first channel state feedback request (e.g., via periodic or aperiodic reporting) scheduling a number of simultaneous channel state calculations. UE 115-*a* may receive another channel state feedback request for a second number of simultaneous channel state calculations. In some cases, UE 115-*a* may already be processing the channel state calculations associated with the first channel state feedback request. The total number of simultaneous channel state calculations may be greater than the number of CPUs available (e.g., unoccupied) at UE 115-*a*, and thus UE 115-*a* may be unable to process all scheduled simultaneous channel state calculations.

UE 115-*a* may determine priorities for the simultaneous channel state calculations. In some cases, UE 115-*a* may determine a priority for the channel state calculations of the first channel state feedback request. Additionally or alternatively, UE 115-*a* may determine a priority for the channel state calculations of the second channel state feedback request. Additionally or alternatively, UE 115-*a* may determine a priority for each of the channel state calculations of the first channel state feedback request, the second channel state feedback request, or both.

UE 115-*a* may determine priorities for the simultaneous channel state calculations based on the type of reporting requested. For example, aperiodic report triggering may have a higher priority than semi-persistent report triggering. Furthermore, semi-persistent report triggering may have a higher priority than periodic report triggering.

UE 115-*a* may determine a priority for a service of the associated channel state feedback request. Upon determining the service type, UE 115-*a* may associate the priority of the service type with the channel state calculation. For example, a priority may be determined based on an indication in a DCI field corresponding to the service of the channel state feedback request. Additionally or alternatively, a priority may be determined based on a search space or CORESET monitored for the service of the channel state feedback request. Additionally or alternatively, a priority may be determined based on a bandwidth part (BWP) of the service of the channel state feedback request. Additionally or alternatively, a priority may be determined based on an RNTI masking for the service of the channel state feedback request. Additionally or alternatively, a priority may be determined based on a scrambling of a downlink control channel (e.g., a physical downlink control channel (PDCCH)) for the service of the channel state feedback request.

In some cases, a priority may be determined implicitly. For example, UE 115-*a* may determine a block error rate (BLER) for a channel state calculation. UE 115-*a* may determine a priority for the channel state calculation based on the determined BLER (e.g., a lower BLER may correspond to a higher priority). In other cases, UE 115-*a* may determine a priority based on whether a RNTI is configured for a service. For example, a new RNTI for a service may not be configured. In this example, UE 115-*a* may determine a modulation and coding scheme (MCS) (e.g., 64 Quadrature amplitude modulation (QAM)) based on a received MCS table. UE 115-*a* may also detect DCI formats (formats 0_0, 1_0, 0_1, 1_1, etc.) from a UE-specific search space (USS). Based on the detected formats and determined MCS, UE may determine a priority for a service. In another example, RNTI may be configured for a service. Channel state feedback requests (e.g., DCI messaging) triggering channel state calculations may be scrambled by the configured RNTI. UE 115-*a* may determine a priority for a service based on the configured RNTI.

In some cases, UE 115-*a* may first determine a priority of a service associated with channel calculations. However, in some of these cases, UE 115-*a* may need to further distinguish channel calculations within a service or priority. For example, UE 115-*a* may determine a set of high priority channel state calculations (e.g., URLLC) and a set of low priority channel state calculations (e.g., eMBB communications). However, simply dropping the low priority channel state calculations may still leave a greater number of channel state calculations than UE 115-*a* is capable of performing simultaneously. In some cases, UE 115-*a* may prioritize channel state calculations based on when the corresponding channel state feedback request was received. For instance, UE 115-*a* may determine additional priorities between the high priority channel state calculations to determine the order in which the high priority channel state calculations are performed (e.g., the UE 115-*a* may operate on a first come first served basis for a given set of high priority channel state calculations where measurements for high priority channel state calculations are performed in the order in which the corresponding requests were received).

UE 115-*a* may determine priorities based on other characteristics associated with the channel state calculations. For example, priorities may be based on a number of factors, including a cell index, a CSI reporting type (e.g., semi-persistent reporting, periodic reporting over a control channel or shared channel, etc.), a CSI content type, a CSI report ID, or a TRP ID. In some cases, UE 115-*a* may determine a priority based on a time when a channel state calculation is started.

Priority rules may be established to determine the priority level (e.g., a relative priority) of a CSI report with respect to other transmissions. In particular, the priority level of the CSI report may be based on the CSI report type, such as periodic, semi-persistent, or aperiodic CSI report types. These priority rules based on CSI report type are summarized below in Table 1 and described in more detail herein. For example, periodic-CSI and semi-persistent CSI on a PUCCH may have a priority that is always lower than the priority of low latency (e.g., URLLC) uplink channels (e.g., URLLC scheduling request (URLLC SR), HARQ acknowledgement (HARQ-ACK), or PUSCH). In some cases, lower priority than the priority of low latency (e.g., URLLC) uplink channels may correspond to the priority group of eMBB channels.

For aperiodic-CSI on a PUSCH (with or without data), its priority may be determined by the priority of the uplink grant that schedules the PUSCH. The uplink grant may dynamically indicate (e.g., via a physical layer indication) the priority level of the respective scheduled PUSCH, and the aperiodic-CSI may follow the same priority as the scheduled PUSCH. For example, if the aperiodic-CSI is scheduled to be transmitted on an URLLC PUSCH, then the aperiodic-CSI may have the same priority as an URLLC uplink transmission. In this case, the aperiodic-CSI may be multiplexed with other URLLC uplink control information (UCI) (e.g., HARQ-ACK). In another example, if the aperiodic-CSI is scheduled to be transmitted on an eMBB PUSCH, then the aperiodic-CSI may have the same priority as an eMBB uplink transmission. In this case, the aperiodic-CSI may be multiplexed with other eMBB uplink UCI (e.g., HARQ-ACK).

Semi-persistent CSI on a PUSCH (with or without data), may determine a priority level by following the rules of periodic-CSI or aperiodic-CSI. For example, semi-persistent-CSI on a PUSCH may follow priority rules of periodic-CSI and may have a priority that is always lower than the priority of low latency (e.g., URLLC) uplink channels (e.g., URLLC SR, HARQ-ACK, or PUSCH). In some cases, the lower priority than the priority of low latency (e.g., URLLC) uplink channels may correspond to the priority group of eMBB channels. In another example, semi-persistent-CSI on a PUSCH may follow priority rules of aperiodic-CSI and may be determined by the priority of the uplink grant that schedules the PUSCH. For instance, if the semi-persistent-CSI is scheduled to be transmitted on an URLLC PUSCH, then the semi-persistent-CSI may have the same priority as an URLLC uplink transmission. In this case, the semi-persistent-CSI may be multiplexed with other URLLC uplink UCI (e.g., HARQ-ACK). In another case, if the semi-persistent-CSI is scheduled to be transmitted on an eMBB PUSCH, then the semi-persistent-CSI may have the same priority as an eMBB uplink transmission. In this case, the semi-persistent-CSI may be multiplexed with other eMBB uplink UCI (e.g., HARQ-ACK).

TABLE 1

| CSI Report Type | CSI Report Priority Level |
| --- | --- |
| Periodic | Always lower priority than URLLC |
| Aperiodic | Follows priority of uplink grant |
| Semi-Persistent on PUCCH | Always lower priority than URLLC |
| Semi-Persistent on PUSCH | Always lower priority than URLLC or Follows priority of uplink grant |

UE 115-a may drop channel state calculations based on the determined priorities. Dropping may refer to either dropping scheduled channel state calculations, rescheduling channel state calculations (e.g., to another uplink control channel transmission), or stopping the performing of channel state calculations that are in the process of being calculated. In some cases, dropping may refer to not updating a scheduled channel state calculation, but UE 115-a may still transmit the non-updated channel state calculation. In some cases, UE 115-a may drop all lower priority channel state calculations and may perform all higher priority channel state calculations. Additionally or alternatively, UE 115-a may drop a number of lower priority channel state calculations to allow for all high priority channel state calculations to be performed. For example, there are five CPUs of UE 115-a, and UE 115-a has received channel feedback requests requesting three high priority and four low priority channel state calculations. UE 115-a may drop two of the four low priority channel state calculations to accommodate the three high priority channel state calculations.

In some cases, UE 115-a may determine a drop deadline for channel state calculations. UE 115-a may begin processing a set of channel state calculations. UE 115-a may determine a drop deadline for reception of any additional channel state calculations. For example, if UE 115-a receives a channel state feedback request after expiration of the drop deadline, UE 115-a may discard the channel state calculations associated with the received channel state feedback request. If UE 115-a receives a channel state feedback request prior to expiration of the drop deadline, UE 115-a may determine priorities and drop channel state calculations as discussed in more detail above.

Figure 3:
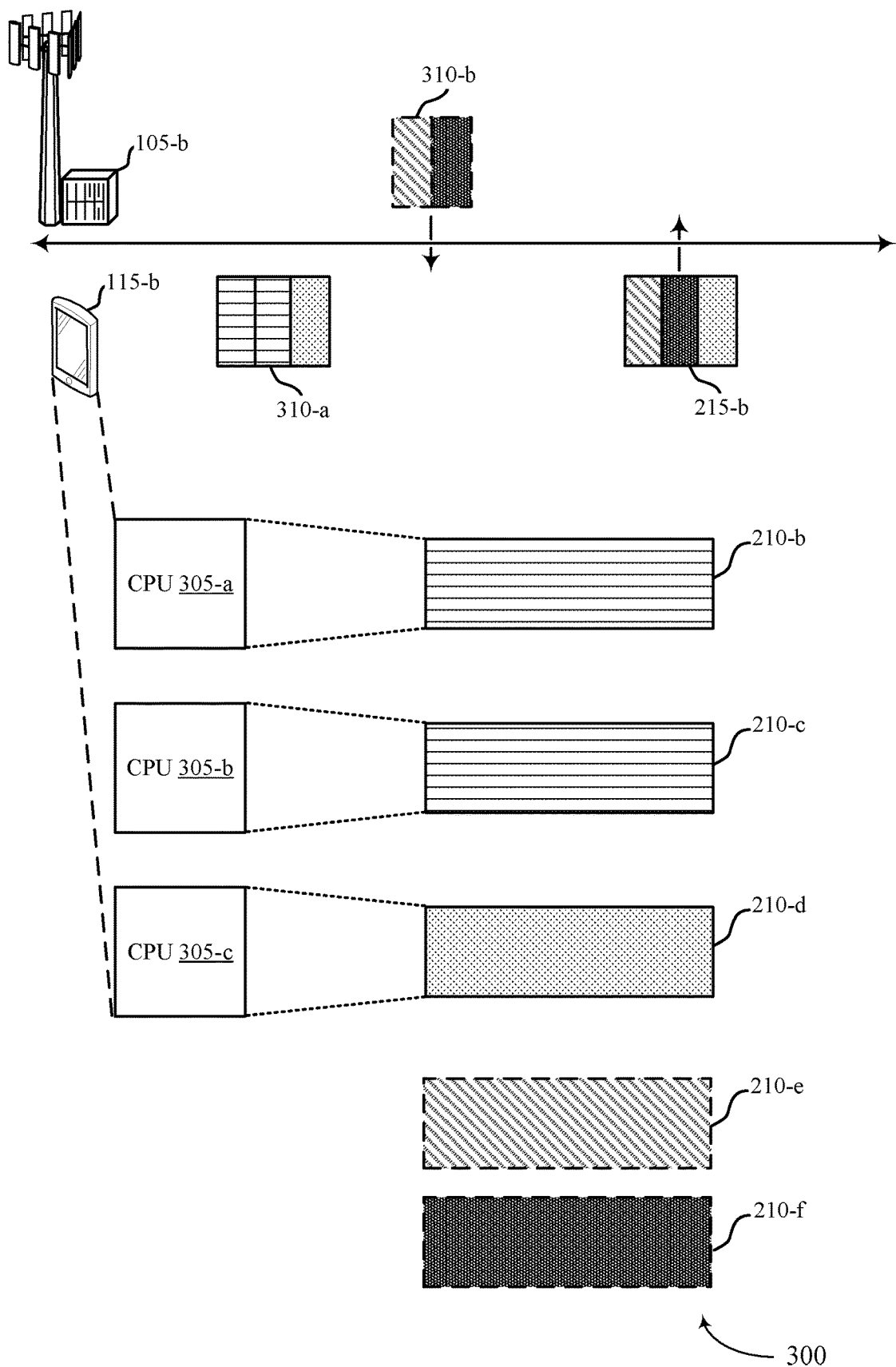
FIG. 3 illustrates an example of a processing timeline that supports feedback prioritization for wireless communications in accordance with aspects of the present disclosure.

FIG. 3 illustrates an example of a processing timeline 300 that supports feedback prioritization for wireless communications in accordance with aspects of the present disclosure. In some examples, processing timeline 300 may implement aspects of wireless communications system 100 and/or 200. Processing timeline 300 may include communications between base station 105-b and UE 115-b, which may be examples of a base station 105 or a UE 115 as described herein. UE 115-a may include CPUs 305-a, 305-b, and 305-c, which each may perform a channel state calculation at a given time.

UE 115-b may identify channel state feedback request 310-a corresponding to channel state calculations 210-a, 210-b, and 210-c. Channel state feedback request 310-a may be a periodic or aperiodic request. If aperiodic, UE 115-b may receive channel state feedback request 310-a from a base station 105.

UE 115-b may schedule channel state calculations 210-b, 210-c, and 210-d to be performed. UE 115-b may allocate each of channel state calculations 210-b, 210-c, and 210-d to one of CPUs 305-a, 305-b, and 305-c. In some cases UE 115-b may begin processing channel state calculations 210-b, 210-c, and 210-d by CPUs 305-a, 305-b, and 305-c, respectively.

UE 115-b may receive channel state feedback request 310-b. As shown in FIG. 3, channel state feedback request 310-b is received by base station 105-b. However, channel state feedback request 310-b may also be periodic, and UE 115-b may identify channel state feedback request 310-b.

Channel state feedback request 310-b may schedule channel state calculations 210-e and 210-f. Channel state calculations 210-e and 210-f may be scheduled to be performed simultaneously with channel state calculations 210-b, 210-c, and 210-d. However, of CPUs 305-a, 305-b, and 305-c may already be occupied with channel state calculations 210-b, 210-c, and 210-d.

UE 115-b may determine a priority for channel state calculations 210-b, 210-c, and 210-d, and for channel state calculations 210-e and 210-f. The priorities may be based on a service type for channel state calculations 210-b, 210-c, and 210-d, and for channel state calculations 210-e and 210-f. For example, UE 115-b may determine that channel state calculations 210-e and 210-f are associated with a service type having a high priority, and may determine that channel state calculations 210-b, 210-c, and 210-d are associated with a service type having a low priority.

UE 115-b may also determine priorities for each of channel state calculations 210-b, 210-c, and 210-d within the low priority service. For example, UE 115-b may determine a low priority for channel state calculations 210-b and 210-c, and may determine a high priority for channel state calculation 210-d.

UE 115-b may determine to drop channel state calculations 210-b and 210-c based on the determined priorities. UE 115-b may suspend processing of channel state calculations 210-b and 210-c by CPUs 305-a and 305-b. UE 115-b may then begin performing channel state calculations 210-e and 210-f.

UE 115-b may generate and transmit channel state feedback message 215-b based on the performed channel state calculations 210-d, 210-e, and 210-f. The dropped channel state calculations 210-b and 210-c may be suspended for a future control channel transmission, or may be canceled from performing.

Figure 4A:
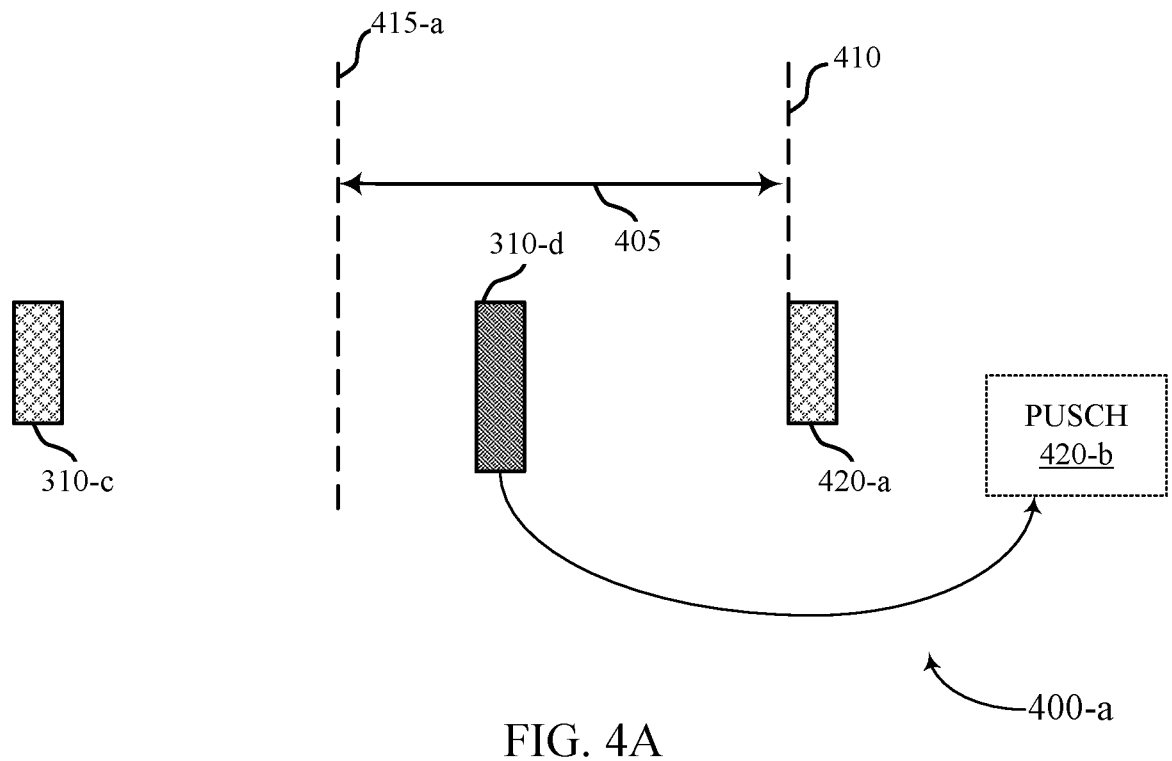
FIGS. 4A and 4B illustrate examples of a dropping timeline that supports feedback prioritization for wireless communications in accordance with aspects of the present disclosure.
Figure 4B:
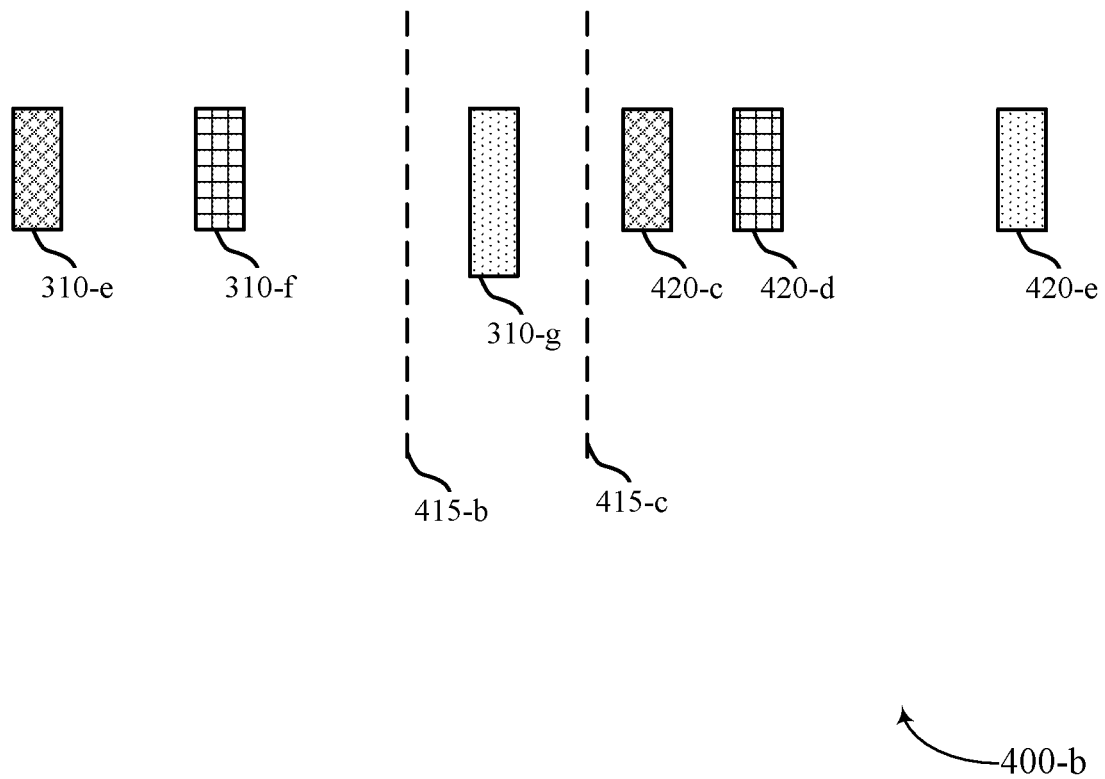

FIGS. 4A and 4B illustrates an example of timelines 400-a and 400-b that support feedback prioritization for wireless communications in accordance with aspects of the present disclosure. In some examples, timelines 400-a and 400-b may implement aspects of wireless communications system 100 or 200, and/or processing timeline 300. Timelines 400-a and 400-b may include communications between a UE 115 and a base station 105 as described herein.

In timeline 400-a, UE 115 may identify a channel state feedback request 310-c corresponding to a set of channel state calculations. UE 115 may determine a drop deadline 415-a for determining whether to drop channel state calculations of channel state feedback request 310-c. Drop deadline 415-a may be based on a start time 410 for an uplink shared channel 420 for transmitting a channel state feedback message and a drop deadline time gap 405. UE 115 may receive channel state feedback request 310-d corresponding to another set of channel state calculations. UE 115 may determine that channel state feedback request 310-d is received after expiration of drop deadline 415-a. Based on the determination, UE 115 may drop the other set of channel state calculations of channel state feedback request 310-d.

In timeline 400-b, UE 115 may receive or identify a channel state feedback request 310-e. UE 115 may determine a drop deadline 415-*b* for channel state feedback request 310-*e*. UE 115 may then receive or identify channel state feedback request 310-*f* UE 115 may determine a drop deadline 415-*c* for channel state feedback request 310-*f* UE 115 may then receive or identify channel state feedback request 310-*g*. UE may determine that channel state feedback request is received after expiration of drop deadline 415-*b* corresponding to channel state feedback request 310-*e*. UE 115 may determine to process channel state calculations associated with channel state feedback request 310-*e* based on the determination that channel state feedback request 310-*g* is received after expiration of drop deadline 415-*b*.

UE 115 may also determine that channel state feedback request 310-*g* is received prior to drop deadline 415-*c*. Based on this determination, UE 115 may determine priorities for channel state calculations associated with channel state feedback requests 310-*f* and 310-*g*. In some cases, UE 115 may drop channel state calculations associated with channel state feedback request 310-*f*, channel state feedback request 310-*g*, or both, based on the determined priorities.

UE 115 may generate and transmit a channel state feedback message corresponding to channel state feedback request 310-*e* in uplink shared channel 420-*c*. UE 115 may generate and transmit channel state feedback message corresponding to channel state feedback requests 310-*f* and 310-*g* in uplink shared channel 420-*d*.

Figure 5:
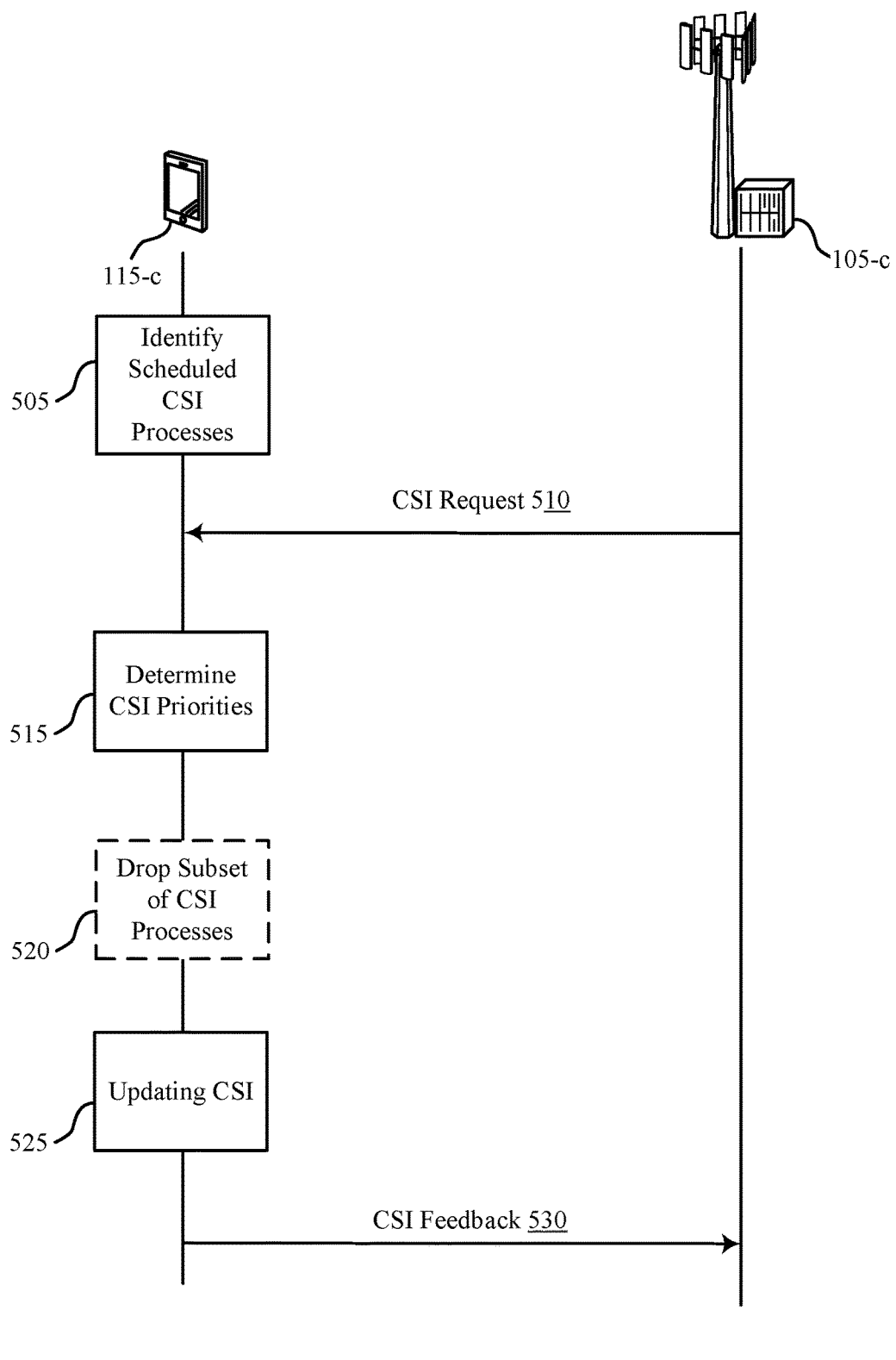
FIG. 5 illustrates an example of a process flow that supports feedback prioritization for wireless communications in accordance with aspects of the present disclosure.

FIG. 5 illustrates an example of a process flow 500 that supports feedback prioritization for wireless communications in accordance with aspects of the present disclosure. In some examples, process flow 500 may implement aspects of wireless communications systems 100 or 200 and may support communications according to processing timeline 300 and timelines 400-*a* and 400-*b*. Process flow 500 may include a base station 105-*c* and a UE 115-*c*, which may be examples of the corresponding devices described herein.

At 505, UE 115-*c* may identify a set of CSI processes scheduled to be reported by the UE. At 510, UE 115-*c* may receive from base station 105-*c* a request that UE 115-*c* is to perform reporting for an additional CSI process. At 515, UE 115-*c* may determine a priority of each of the set of CSI processes and the additional CSI process.

Optionally, at 520, UE 115-*c* may drop at least one CSI process of the set of CSI processes. The dropping may be based at least in part on the at least one CSI process having a lower priority than the additional CSI process.

At 525, UE 115-*c* may update CSI for a subset of CSI processes. The updating may be based at least in part on a capability of UE 115-*c*, the priority of each of the set of CSI processes, and priority of the additional CSI process.

Figure 6:
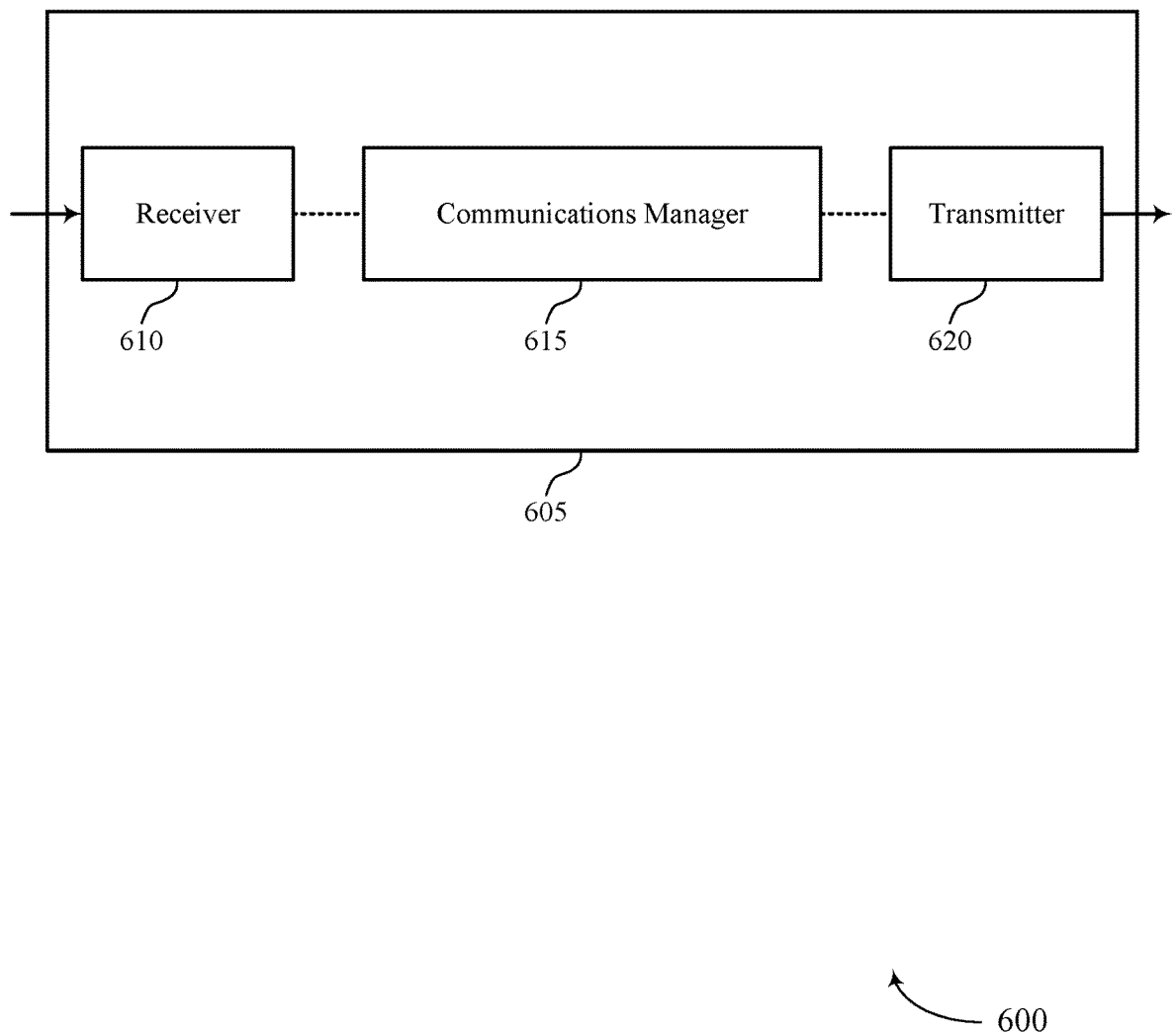
FIGS. 6 and 7 show block diagrams of devices that support feedback prioritization for wireless communications in accordance with aspects of the present disclosure.

At 525, UE 115-*c* may transmit to base station 105-*c* updated CSI feedback corresponding to the subset of CSI processes FIG. 6 shows a block diagram 600 of a device 605 that supports feedback prioritization for wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to feedback prioritization for wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a set of CSI processes scheduled to be reported by the UE, receive a request that the UE is to perform reporting for an additional CSI process, determine a priority of each of the set of CSI processes and the additional CSI process, update CSI for a subset of CSI processes based on a capability of the UE and the priority of each of the set of CSI processes and the additional CSI process, and transmit updated CSI feedback corresponding to the subset of CSI processes. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
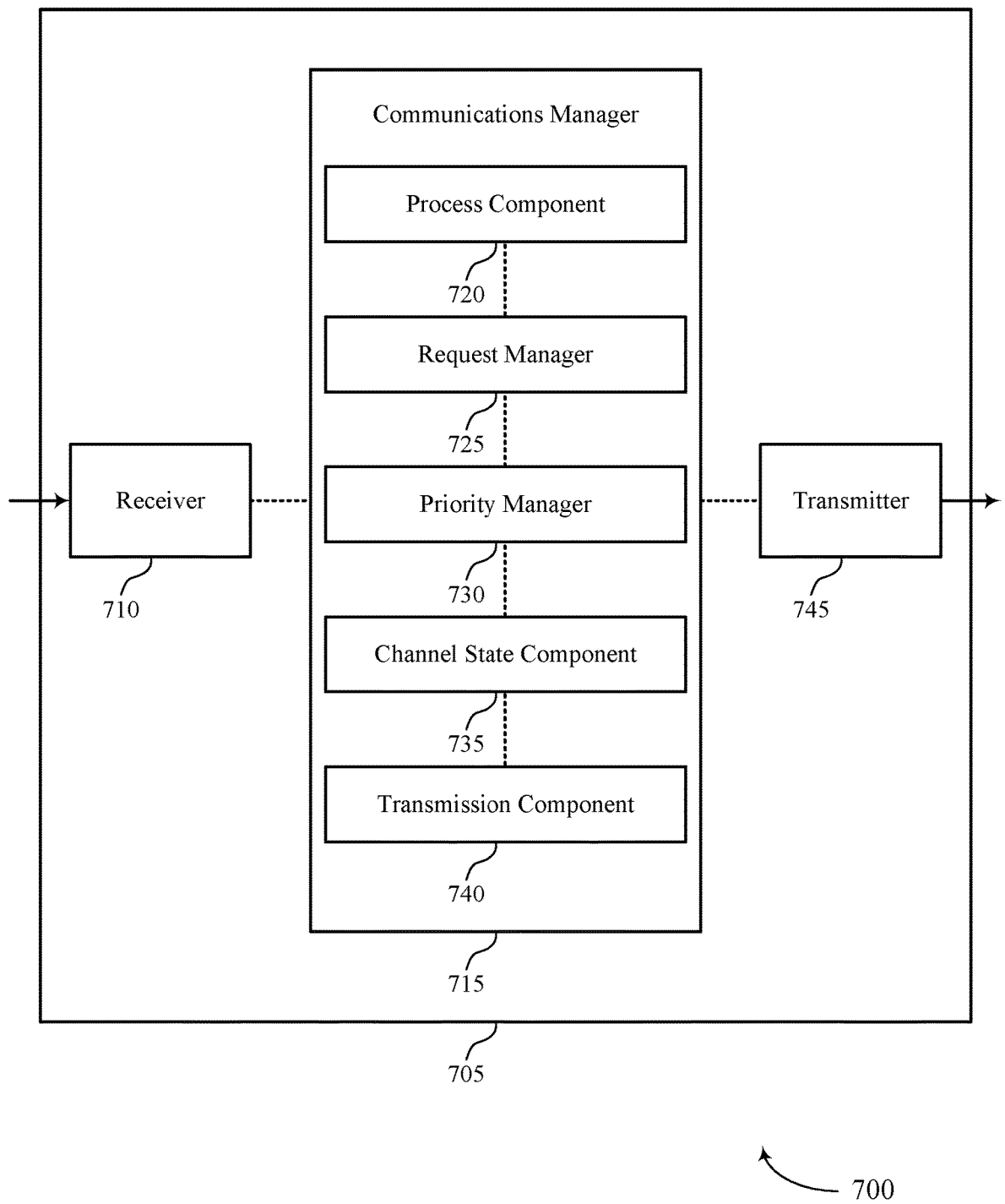

FIG. 7 shows a block diagram 700 of a device 705 that supports feedback prioritization for wireless communications in accordance with aspects of the present disclosure. The device 705 may be an example of aspects of a device 605 or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to feedback prioritization for wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a process component 720, a request manager 725, a priority manager 730, a channel state component 735, and a transmission component 740. The communications manager 715 may be an example of aspects of the communications manager 910 described herein.

The process component 720 may identify a set of CSI processes scheduled to be reported by the UE.

The request manager 725 may receive a request that the UE is to perform reporting for an additional CSI process.

The priority manager 730 may determine a priority of each of the set of CSI processes and the additional CSI process.

The channel state component 735 may update CSI for a subset of CSI processes based on a capability of the UE and the priority of each of the set of CSI processes and the additional CSI process.

The channel state component 735 may update CSI for a subset of CSI processes based on respective timings for requests received for the set of CSI processes and the additional CSI process.

The transmission component 740 may transmit updated CSI feedback corresponding to the subset of CSI processes.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
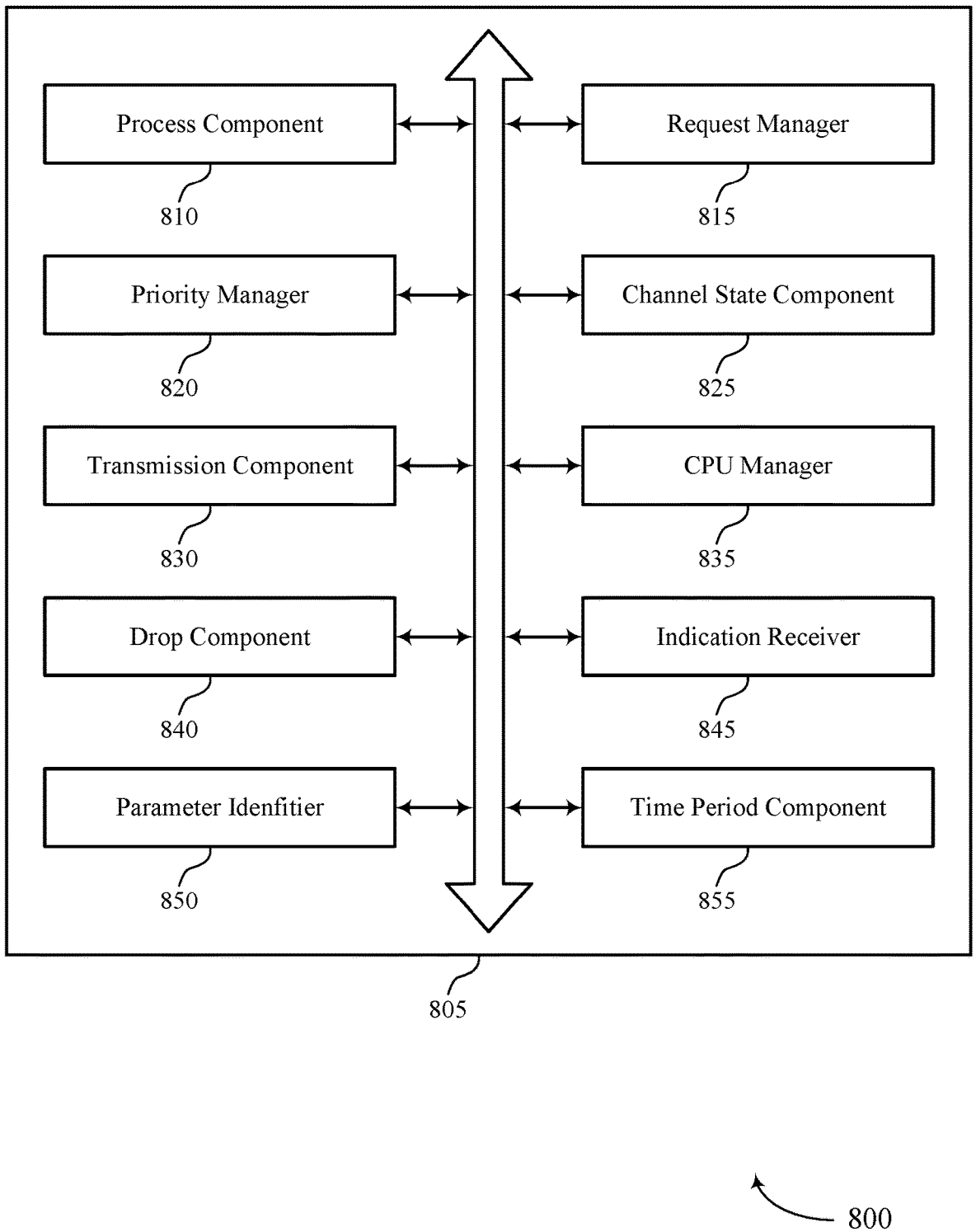
FIG. 8 shows a block diagram of a communications manager that supports feedback prioritization for wireless communications in accordance with aspects of the present disclosure.

FIG. 8 shows a block diagram 800 of a communications manager 805 that supports feedback prioritization for wireless communications in accordance with aspects of the present disclosure. The communications manager 805 may be an example of aspects of a communications manager 615, a communications manager 715, or a communications manager 910 described herein. The communications manager 805 may include a process component 810, a request manager 815, a priority manager 820, a channel state component 825, a transmission component 830, a CPU manager 835, a drop component 840, an indication receiver 845, a parameter identifier 850, and a time period component 855. Each of these modules may communicate, directly or indirectly, with one another (e.g., via one or more buses).

The process component 810 may identify a set of CSI processes scheduled to be reported by the UE.

The request manager 815 may receive a request that the UE is to perform reporting for an additional CSI process. In some examples, the request manager 815 may determine that the request is received after the identified expiration time period.

The priority manager 820 may determine a priority of each of the set of CSI processes and the additional CSI process. In some examples, the priority manager 820 may determine the priority of each of the set of CSI processes and the additional CSI process based on the indication of priority. In some cases, the priority manager 820 may determine the priority of each of the set of CSI processes and the additional CSI process based on at least one of the determined service type, cell index, CSI feedback type, CSI content type, TRP ID, CSI ID, or any combination thereof. In some cases, the priority manager 820 may determine that the priority of each of the set of CSI processes and the additional CSI process is the same. In some cases, the priority manager 820 may determine that the priority of each of the set of CSI processes is lower than the priority of the additional CSI process.

The channel state component 825 may update CSI for a subset of CSI processes based on a capability of the UE and the priority of each of the set of CSI processes and the additional CSI process. In some examples, the channel state component 825 may update CSI for the subset of CSI processes based on determining whether the set of CSI processes and the additional CSI process exceeds the number of CPUs of the UE. In some examples, the channel state component 825 may update CSI for the subset of CSI processes based on respective timings for the requests received for the set of CSI processes and the additional CSI process. For example, CSI processes associated with requests received by the UE earlier may be performed before other CSI processes having requests that were received later by the UE.

The transmission component 830 may transmit updated CSI feedback corresponding to the subset of CSI processes. In some examples, transmitting CSI feedback corresponding to the set of CSI processes and the additional CSI process, where the CSI feedback includes updated CSI feedback for the subset of CSI processes. In some cases, the CSI feedback includes stale information for at least one CSI process. In some aspects, the CSI feedback excludes information for at least one CSI process.

The CPU manager 835 may identify a number of CPUs of the UE capable of performing a CSI process. In some examples, the CPU manager 835 may determine whether the set of CSI processes and the additional CSI process exceeds the number of CPUs of the UE. In some examples, the CPU manager 835 may determine that the number of CPUs of the UE is less than a number of CSI processing unites for performing the additional CSI process.

The drop component 840 may drop at least one CSI process of the set of CSI processes based on the at least one CSI process having a lower priority than the additional CSI process. In some examples, the drop component 840 may refrain from transmitting feedback for the at least one CSI process. In some cases, the drop component 840 may refrain from updating CSI for the at least one CSI process. In some instances, the drop component 840 may cease an ongoing computation of CSI for the at least one CSI process. In some aspects, the drop component 840 may drop the additional CSI process based on the additional CSI process having a lower priority than each CSI process of the set of CSI processes. In some examples, the drop component 840 may drop all of the CSI processes of the set of CSI processes scheduled to be reported by the UE based on receiving the request that the UE is to perform reporting for an additional CSI process.

In some examples, the drop component 840 may drop the additional CSI process based on that the request is received after the identified expiration time period. In some cases, the subset of CSI processes includes the additional CSI process and excludes the at least one CSI process. In some instances, the subset of CSI processes includes each CSI process of the set of CSI processes and excludes the additional CSI process.

In some cases, the additional CSI process is of higher priority than the set of CSI processes and a number of available CPUs of the UE is less than a number of CPUs for performing the additional CSI process.

The indication receiver 845 may receive an indication of priority for each of the set of CSI processes or the additional CSI process.

In some cases, the indication of priority for at least one CSI process of the set of CSI processes includes a DCI field associated with the at least one CSI process, a search space associated with the at least one CSI process, a CORESET associated with the at least one CSI process, a BWP associated with the at least one CSI process, an RNTI masking parameter associated with the at least one CSI process, a scrambling sequence for a PDCCH associated with the at least one CSI process, a TRP ID associated with the at least one CSI process, a BLER associated with the at least one CSI process, or any combination thereof.

In some cases, the indication of priority for the additional CSI process includes a DCI field associated with the additional CSI process, a search space associated with the additional CSI process, a CORESET associated with the additional CSI process, a BWP associated with the additional CSI process, an RNTI masking parameter associated with the additional CSI process, a scrambling sequence for a PDCCH associated with the additional CSI process, a TRP ID associated with the additional CSI process, a BLER associated with the additional CSI process, or any combination thereof.

The parameter identifier 850 may determine a service type, a cell index, a CSI feedback type, a CSI content type, a TRP ID, or a CSI ID associated with at least one CSI process of the set of CSI processes or the additional CSI process.

The time period component 855 may identify an expiration time period for reception of the request. In some examples, the time period component 855 may determine a computation time period for performing the additional CSI process. In some cases, the computation time period includes a time period between a last symbol of a last CSI reference signal and a first symbol of an uplink transmission carrying the CSI feedback. In some aspects, the computation time period includes a time period between a last symbol of a last CSI reference signal and a first symbol of an uplink shared channel transmission or an uplink control channel transmission.

Figure 9:
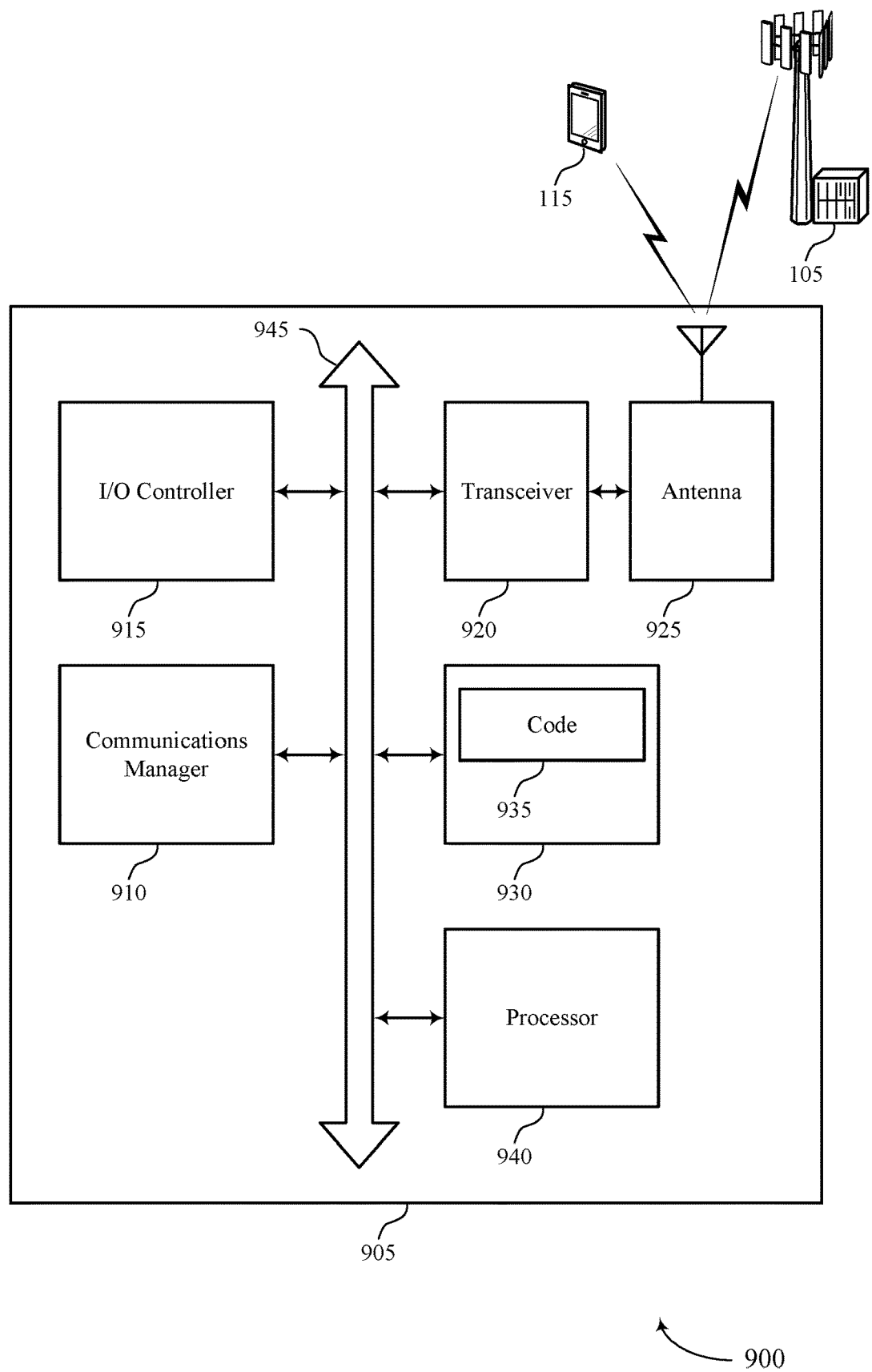
FIG. 9 shows a diagram of a system including a device that supports feedback prioritization for wireless communications in accordance with aspects of the present disclosure.

FIG. 9 shows a diagram of a system 900 including a device 905 that supports feedback prioritization for wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a set of CSI processes scheduled to be reported by the UE, receive a request that the UE is to perform reporting for an additional CSI process, determine a priority of each of the set of CSI processes and the additional CSI process, update CSI for a subset of CSI processes based on a capability of the UE and the priority of each of the set of CSI processes and the additional CSI process, and transmit updated CSI feedback corresponding to the subset of CSI processes.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include Random Access Memory (RAM) and Read-only Memory (ROM). The memory 930 may store computer-readable, computer-executable code 935 including instructions that, when executed, cause the processor to perform various functions described herein. In some cases, the memory 930 may contain, among other things, a Basic I/O System (BIOS) which may control basic hardware or software operation such as the interaction with peripheral components or devices.

The processor 940 may include an intelligent hardware device, (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting feedback prioritization for wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
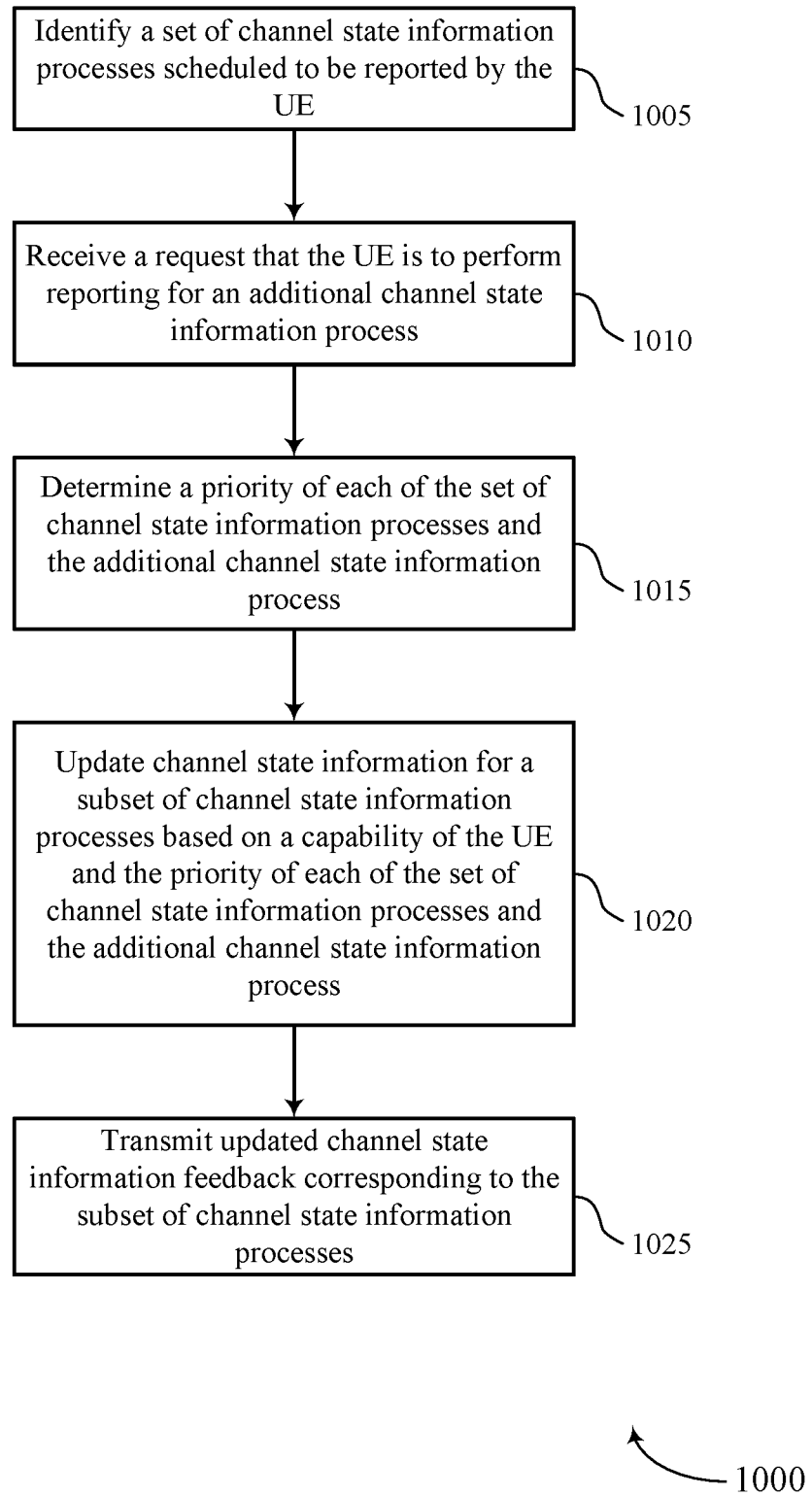
FIGS. 10 through 12 show flowcharts illustrating methods that support feedback prioritization for wireless communications in accordance with aspects of the present disclosure.

FIG. 10 shows a flowchart illustrating a method 1000 that supports feedback prioritization for wireless communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may identify a set of CSI processes scheduled to be reported by the UE. The operations of 1005 may be performed according to the methods described herein. In some examples, aspects of the operations of 1005 may be performed by a process component as described with reference to FIGS. 6 through 9.

At 1010, the UE may receive a request that the UE is to perform reporting for an additional CSI process. The operations of 1010 may be performed according to the methods described herein. In some examples, aspects of the operations of 1010 may be performed by a request manager as described with reference to FIGS. 6 through 9.

At 1015, the UE may determine a priority of each of the set of CSI processes and the additional CSI process. The operations of 1015 may be performed according to the methods described herein. In some examples, aspects of the operations of 1015 may be performed by a priority manager as described with reference to FIGS. 6 through 9.

At 1020, the UE may update CSI for a subset of CSI processes based on a capability of the UE and the priority of each of the set of CSI processes and the additional CSI process. The operations of 1020 may be performed according to the methods described herein. In some examples, aspects of the operations of 1020 may be performed by a channel state component as described with reference to FIGS. 6 through 9.

At 1025, the UE may transmit updated CSI feedback corresponding to the subset of CSI processes. The operations of 1025 may be performed according to the methods described herein. In some examples, aspects of the operations of 1025 may be performed by a transmission component as described with reference to FIGS. 6 through 9.

Figure 11:
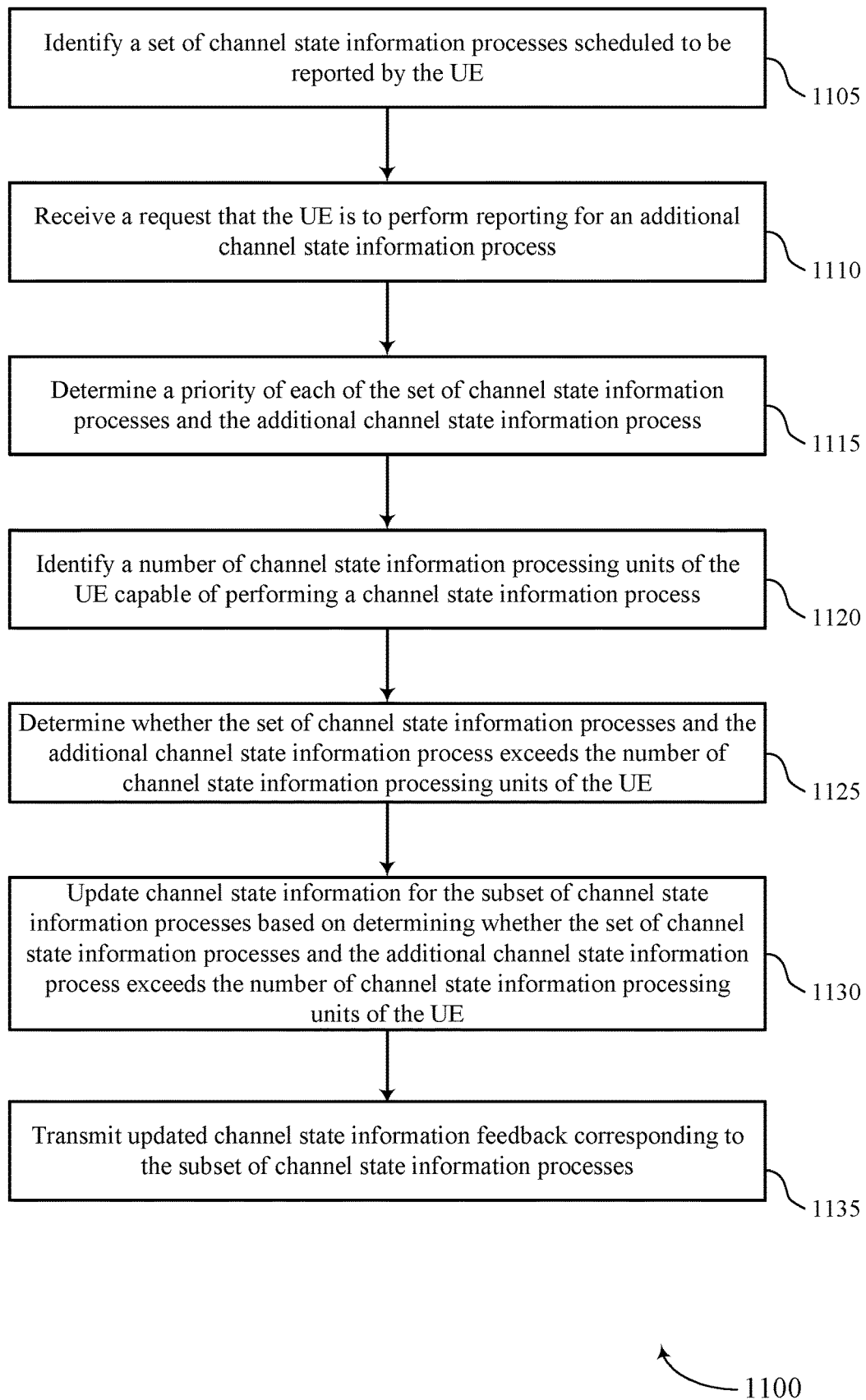

FIG. 11 shows a flowchart illustrating a method 1100 that supports feedback prioritization for wireless communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may identify a set of CSI processes scheduled to be reported by the UE. The operations of 1105 may be performed according to the methods described herein. In some examples, aspects of the operations of 1105 may be performed by a process component as described with reference to FIGS. 6 through 9.

At 1110, the UE may receive a request that the UE is to perform reporting for an additional CSI process. The operations of 1110 may be performed according to the methods described herein. In some examples, aspects of the operations of 1110 may be performed by a request manager as described with reference to FIGS. 6 through 9.

At 1115, the UE may determine a priority of each of the set of CSI processes and the additional CSI process. The operations of 1115 may be performed according to the methods described herein. In some examples, aspects of the operations of 1115 may be performed by a priority manager as described with reference to FIGS. 6 through 9.

At 1120, the UE may identify a number of CPUs of the UE capable of performing a CSI process. The operations of 1120 may be performed according to the methods described herein. In some examples, aspects of the operations of 1120 may be performed by a CPU manager as described with reference to FIGS. 6 through 9.

At 1125, the UE may determine whether the set of CSI processes and the additional CSI process exceeds the number of CPUs of the UE. The operations of 1125 may be performed according to the methods described herein. In some examples, aspects of the operations of 1125 may be performed by a CPU manager as described with reference to FIGS. 6 through 9.

At 1130, the UE may update CSI for the subset of CSI processes based on determining whether the set of CSI processes and the additional CSI process exceeds the number of CPUs of the UE. The operations of 1130 may be performed according to the methods described herein. In some examples, aspects of the operations of 1130 may be performed by a channel state component as described with reference to FIGS. 6 through 9.

At 1135, the UE may transmit updated CSI feedback corresponding to the subset of CSI processes. The operations of 1135 may be performed according to the methods described herein. In some examples, aspects of the operations of 1135 may be performed by a transmission component as described with reference to FIGS. 6 through 9.

Figure 12:
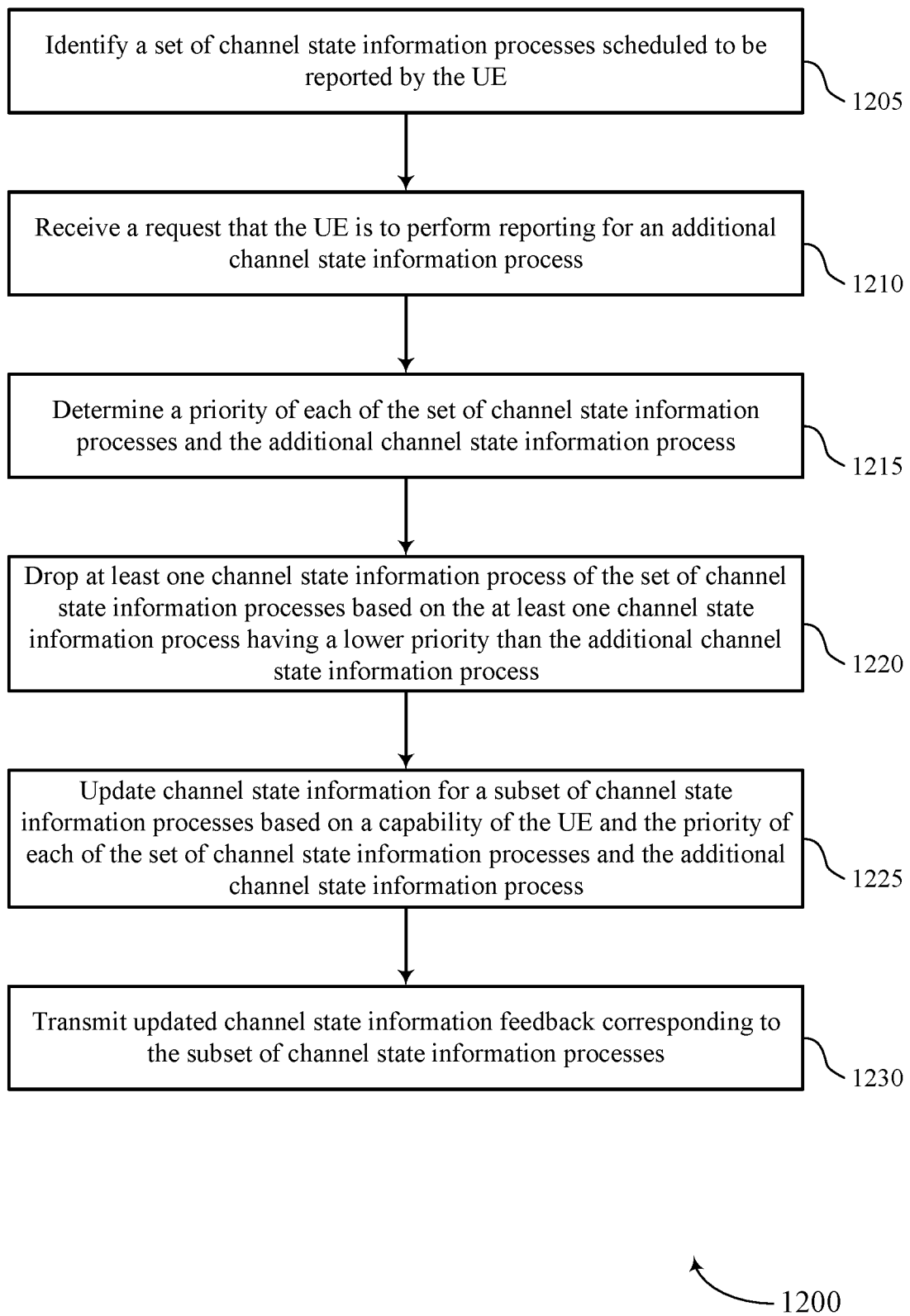

FIG. 12 shows a flowchart illustrating a method 1200 that supports feedback prioritization for wireless communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may identify a set of CSI processes scheduled to be reported by the UE. The operations of 1205 may be performed according to the methods described herein. In some examples, aspects of the operations of 1205 may be performed by a process component as described with reference to FIGS. 6 through 9.

At 1210, the UE may receive a request that the UE is to perform reporting for an additional CSI process. The operations of 1210 may be performed according to the methods described herein. In some examples, aspects of the operations of 1210 may be performed by a request manager as described with reference to FIGS. 6 through 9.

At 1215, the UE may determine a priority of each of the set of CSI processes and the additional CSI process. The operations of 1215 may be performed according to the methods described herein. In some examples, aspects of the operations of 1215 may be performed by a priority manager as described with reference to FIGS. 6 through 9.

At 1220, the UE may drop at least one CSI process of the set of CSI processes based on the at least one CSI process having a lower priority than the additional CSI process. The operations of 1220 may be performed according to the methods described herein. In some examples, aspects of the operations of 1220 may be performed by a drop component as described with reference to FIGS. 6 through 9.

At 1225, the UE may update CSI for a subset of CSI processes based on a capability of the UE and the priority of each of the set of CSI processes and the additional CSI process. The operations of 1225 may be performed according to the methods described herein. In some examples, aspects of the operations of 1225 may be performed by a channel state component as described with reference to FIGS. 6 through 9.

At 1230, the UE may transmit updated CSI feedback corresponding to the subset of CSI processes. The operations of 1230 may be performed according to the methods described herein. In some examples, aspects of the operations of 1230 may be performed by a transmission component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a set of channel state information processes scheduled to be reported by the UE;
   identifying a quantity of channel state information processing units of the UE, wherein each channel state information processing unit of the quantity of channel state information processing units is capable of performing a channel state information process of the set of channel state information processes;
   receiving a request that the UE is to perform reporting for an additional channel state information process;
   determining a priority of each of the set of channel state information processes and the additional channel state information process;
   updating channel state information for a subset of channel state information processes based at least in part on a capability of the UE and the priority of each of the set of channel state information processes and the additional channel state information process, wherein the capability of the UE is based at least in part on the quantity of channel state information processing units, and wherein the subset of channel state information processes is a quantity of channel state information processes that is less than or equal to the quantity of channel state information processing units of the UE; and
   transmitting updated channel state information feedback corresponding to the subset of channel state information processes.

2. The method of claim 1, wherein transmitting updated channel state information feedback comprises:
   transmitting channel state information feedback corresponding to the set of channel state information processes and the additional channel state information process, wherein the channel state information feedback comprises updated channel state information feedback for the subset of channel state information processes.

3. The method of claim 2, wherein the channel state information feedback comprises stale information for at least one channel state information process.

4. The method of claim 2, wherein the channel state information feedback excludes information for at least one channel state information process.

5. The method of claim 1, further comprising:
   determining whether the set of channel state information processes and the additional channel state information process exceeds the quantity of channel state information processing units of the UE; and
   updating channel state information for the subset of channel state information processes based at least in part on determining whether the set of channel state information processes and the additional channel state information process exceeds the quantity of channel state information processing units of the UE.

6. The method of claim 1, further comprising:
   dropping at least one channel state information process of the set of channel state information processes based at least in part on the at least one channel state information process having a lower priority than the additional channel state information process.

7. The method of claim 6, wherein the subset of channel state information processes includes the additional channel state information process and excludes the at least one channel state information process.

8. The method of claim 6, wherein dropping the at least one channel state information process comprises:
   refraining from transmitting feedback for the at least one channel state information process.

9. The method of claim 6, wherein dropping the at least one channel state information process comprises:
   refraining from updating channel state information for the at least one channel state information process.

10. The method of claim 9, wherein refraining from updating channel state information comprises:

ceasing an ongoing computation of channel state information for the at least one channel state information process.

11. The method of claim 1, further comprising:
dropping the additional channel state information process based at least in part on the additional channel state information process having a lower priority than each channel state information process of the set of channel state information processes.

12. The method of claim 11, wherein the subset of channel state information processes includes each channel state information process of the set of channel state information processes and excludes the additional channel state information process.

13. The method of claim 1, further comprising:
receiving an indication of priority for each of the set of channel state information processes or the additional channel state information process; and
determining the priority of each of the set of channel state information processes and the additional channel state information process based at least in part on the indication of priority.

14. The method of claim 13, wherein the indication of priority for at least one channel state information process of the set of channel state information processes comprises a downlink control information (DCI) field associated with the at least one channel state information process, a search space associated with the at least one channel state information process, a control resource set associated with the at least one channel state information process, a bandwidth part associated with the at least one channel state information process, a radio network temporary identifier (RNTI) masking parameter associated with the at least one channel state information process, a scrambling sequence for a physical downlink control channel (PDCCH) associated with the at least one channel state information process, a transmission reception point identifier associated with the at least one channel state information process, a block error rate (BLER) associated with the at least one channel state information process, or any combination thereof.

15. The method of claim 13, wherein the indication of priority for the additional channel state information process comprises a downlink control information (DCI) field associated with the additional channel state information process, a search space associated with the additional channel state information process, a control resource set associated with the additional channel state information process, a bandwidth part associated with the additional channel state information process, a radio network temporary identifier (RNTI) masking parameter associated with the additional channel state information process, a scrambling sequence for a physical downlink control channel (PDCCH) associated with the additional channel state information process, a transmission reception point identifier associated with the additional channel state information process, a block error rate (BLER) associated with the additional channel state information process, or any combination thereof.

16. The method of claim 1, further comprising:
determining a service type, a cell index, a channel state information feedback type, a channel state information content type, a transmission reception point identifier (ID), or a channel state information ID associated with at least one channel state information process of the set of channel state information processes or the additional channel state information process; and
determining the priority of each of the set of channel state information processes and the additional channel state information process based at least in part on at least one of the determined service type, cell index, channel state information feedback type, channel state information content type, transmission reception point ID, channel state information identifier ID, or any combination thereof.

17. The method of claim 1, further comprising:
identifying an expiration time period for reception of the request;
determining that the request is received after the identified expiration time period; and
dropping the additional channel state information process based at least in part on that the request is received after the identified expiration time period.

18. The method of claim 17, wherein identifying the expiration time period further comprises:
determining a computation time period for performing the additional channel state information process.

19. The method of claim 18, wherein the computation time period comprises a time period between a last symbol of a last channel state information reference signal and a first symbol of an uplink transmission carrying the channel state information feedback.

20. The method of claim 18, wherein the computation time period comprises a time period between a last symbol of a last channel state information reference signal and a first symbol of an uplink shared channel transmission or an uplink control channel transmission.

21. The method of claim 1, further comprising:
dropping all channel state information processes of the set of channel state information processes scheduled to be reported by the UE based at least in part on receiving the request that the UE is to perform reporting for the additional channel state information process.

22. The method of claim 21, wherein the additional channel state information process is of higher priority than the set of channel state information processes and a quantity of available channel state information processing units of the UE is less than a quantity of channel state information processing units for performing the additional channel state information process.

23. The method of claim 1, further comprising:
determining that the priority of each of the set of channel state information processes and the additional channel state information process is the same; and
updating the channel state information for the subset of channel state information processes according to respective timings for requests received for the set of channel state information processes and the additional channel state information process.

24. An apparatus for wireless communication at a user equipment (UE), comprising:
a processor,
memory coupled with the processor; and
instructions stored in the memory and executable by the processor to cause the apparatus to:
identify a set of channel state information processes scheduled to be reported by the UE;
identify a quantity of channel state information processing units of the UE, wherein each channel state information processing unit of the quantity of channel state information processing units is capable of performing a channel state information process of the set of channel state information processes;
receive a request that the UE is to perform reporting for an additional channel state information process;

determine a priority of each of the set of channel state information processes and the additional channel state information process;

update channel state information for a subset of channel state information processes based at least in part on a capability of the UE and the priority of each of the set of channel state information processes and the additional channel state information process, wherein the capability of the UE is based at least in part on the quantity of channel state information processing units, and wherein the subset of channel state information processes is a quantity of channel state information processes that is less than or equal to the quantity of channel state information processing units of the UE; and transmit updated channel state information feedback corresponding to the subset of channel state information processes.

25. The apparatus of claim 24, wherein the instructions to transmit updated channel state information feedback are executable by the processor to cause the apparatus to:

transmit channel state information feedback corresponding to the set of channel state information processes and the additional channel state information process, wherein the channel state information feedback comprises updated channel state information feedback for the subset of channel state information processes.

26. The apparatus of claim 25, wherein the channel state information feedback comprises stale information for at least one channel state information process.

27. The apparatus of claim 25, wherein: the channel state information feedback excludes information for at least one channel state information process.

28. The apparatus of claim 24, wherein the instructions are further executable by the processor to cause the apparatus to:

determine whether the set of channel state information processes and the additional channel state information process exceeds the quantity of channel state information processing units of the UE; and update channel state information for the subset of channel state information processes based at least in part on determining whether the set of channel state information processes and the additional channel state information process exceeds the quantity of channel state information processing units of the UE.

29. The apparatus of claim 24, wherein the instructions are further executable by the processor to cause the apparatus to:

drop at least one channel state information process of the set of channel state information processes based at least in part on the at least one channel state information process having a lower priority than the additional channel state information process.

30. The apparatus of claim 29, wherein the subset of channel state information processes includes the additional channel state information process and excludes the at least one channel state information process.

31. The apparatus of claim 29, wherein the instructions to drop the at least one channel state information process are executable by the processor to cause the apparatus to:

refrain from transmitting feedback for the at least one channel state information process.

32. The apparatus of claim 29, wherein the instructions to drop the at least one channel state information process are executable by the processor to cause the apparatus to:

refrain from updating channel state information for the at least one channel state information process.

33. The apparatus of claim 32, wherein the instructions to refrain from updating channel state information are executable by the processor to cause the apparatus to:

cease an ongoing computation of channel state information for the at least one channel state information process.

34. The apparatus of claim 24, wherein the instructions are further executable by the processor to cause the apparatus to:

drop the additional channel state information process based at least in part on the additional channel state information process having a lower priority than each channel state information process of the set of channel state information processes.

35. The apparatus of claim 34, wherein the subset of channel state information processes includes each channel state information process of the set of channel state information processes and excludes the additional channel state information process.

36. The apparatus of claim 24, wherein the instructions are further executable by the processor to cause the apparatus to:

receive an indication of priority for each of the set of channel state information processes or the additional channel state information process; and determine the priority of each of the set of channel state information processes and the additional channel state information process based at least in part on the indication of priority.

37. The apparatus of claim 36, wherein the indication of priority for at least one channel state information process of the set of channel state information processes comprises a downlink control information (DCI) field associated with the at least one channel state information process, a search space associated with the at least one channel state information process, a control resource set associated with the at least one channel state information process, a bandwidth part associated with the at least one channel state information process, a radio network temporary identifier (RNTI) masking parameter associated with the at least one channel state information process, a scrambling sequence for a physical downlink control channel (PDCCH) associated with the at least one channel state information process, a transmission reception point identifier associated with the at least one channel state information process, a block error rate (BLER) associated with the at least one channel state information process, or any combination thereof.

38. The apparatus of claim 36, wherein the indication of priority for the additional channel state information process comprises a downlink control information (DCI) field associated with the additional channel state information process, a search space associated with the additional channel state information process, a control resource set associated with the additional channel state information process, a bandwidth part associated with the additional channel state information process, a radio network temporary identifier (RNTI) masking parameter associated with the additional channel state information process, a scrambling sequence for a physical downlink control channel (PDCCH) associated with the additional channel state information process, a transmission reception point identifier associated with the additional channel state information process, a block error rate (BLER) associated with the additional channel state information process, or any combination thereof.

39. The apparatus of claim 24, wherein the instructions are further executable by the processor to cause the apparatus to:
- determine a service type, a cell index, a channel state information feedback type, a channel state information content type, a transmission reception point identifier (ID), or a channel state information ID associated with at least one channel state information process of the set of channel state information processes or the additional channel state information process; and
- determine the priority of each of the set of channel state information processes and the additional channel state information process based at least in part on at least one of the determined service type, cell index, channel state information feedback type, channel state information content type, transmission reception point ID, channel state information identifier ID, or any combination thereof.

40. The apparatus of claim 24, wherein the instructions are further executable by the processor to cause the apparatus to:
- identify an expiration time period for reception of the request;
- determine that the request is received after the identified expiration time period; and
- drop the additional channel state information process based at least in part on that the request is received after the identified expiration time period.

41. The apparatus of claim 40, wherein the instructions to identify the expiration time period further are executable by the processor to cause the apparatus to:
- determine a computation time period for performing the additional channel state information process.

42. The apparatus of claim 41, wherein the computation time period comprises a time period between a last symbol of a last channel state information reference signal and a first symbol of an uplink transmission carrying the channel state information feedback.

43. The apparatus of claim 41, wherein the computation time period comprises a time period between a last symbol of a last channel state information reference signal and a first symbol of an uplink shared channel transmission or an uplink control channel transmission.

44. The apparatus of claim 24, wherein the instructions are further executable by the processor to cause the apparatus to:
- drop all channel state information processes of the set of channel state information processes scheduled to be reported by the UE based at least in part on the received request that the UE is to perform reporting for the additional channel state information process.

45. The apparatus of claim 24, wherein the additional channel state information process is of higher priority than the set of channel state information processes and a quantity of available channel state information processing units of the UE is less than a quantity of channel state information processing units for performing the additional channel state information process.

46. The apparatus of claim 24, wherein the instructions are further executable by the processor to cause the apparatus to:
- determine that the priority of each of the set of channel state information processes and the additional channel state information process is the same; and
- update the channel state information for the subset of channel state information processes according to respective timings for requests received for the set of channel state information processes and the additional channel state information process.

47. An apparatus for wireless communication at a user equipment (UE), comprising:
- means for identifying a set of channel state information processes scheduled to be reported by the UE;
- means for identifying a quantity of channel state information processing units of the UE, wherein each channel state information processing unit of the quantity of channel state information processing units is capable of performing a channel state information process of the set of channel state information processes;
- means for receiving a request that the UE is to perform reporting for an additional channel state information process;
- means for determining a priority of each of the set of channel state information processes and the additional channel state information process;
- means for updating channel state information for a subset of channel state information processes based at least in part on a capability of the UE and the priority of each of the set of channel state information processes and the additional channel state information process, wherein the capability of the UE is based at least in part on the quantity of channel state information processing units, and wherein the subset of channel state information processes is a quantity of channel state information processes that is less than or equal to the quantity of channel state information processing units of the UE; and
- means for transmitting updated channel state information feedback corresponding to the subset of channel state information processes.

48. A non-transitory computer-readable medium storing code for wireless communication at a user equipment (UE), the code comprising instructions executable by a processor to:
- identify a set of channel state information processes scheduled to be reported by the UE;
- identify a quantity of channel state information processing units of the UE, wherein each channel state information processing unit of the quantity of channel state information processing units is capable of performing a channel state information process of the set of channel state information processes;
- receive a request that the UE is to perform reporting for an additional channel state information process;
- determine a priority of each of the set of channel state information processes and the additional channel state information process;
- update channel state information for a subset of channel state information processes based at least in part on a capability of the UE and the priority of each of the set of channel state information processes and the additional channel state information process, wherein the capability of the UE is based at least in part on the quantity of channel state information processing units, and wherein the subset of channel state information processes is a quantity of channel state information processes that is less than or equal to the quantity of channel state information processing units of the UE; and
- transmit updated channel state information feedback corresponding to the subset of channel state information processes.

* * * * *